United States Patent [19]

Heger

[11] Patent Number: 5,083,383

[45] Date of Patent: Jan. 28, 1992

[54] ELECTRONIC CAPACITANCE LEVEL WITH AUTOMATIC ELECTRODE SELECTION

[75] Inventor: Charles E. Heger, Saratoga, Calif.

[73] Assignee: Zircon International, Inc., Campbell, Calif.

[21] Appl. No.: 696,988

[22] Filed: May 2, 1991

Related U.S. Application Data

[63] Continuation of Ser. No. 486,643, Feb. 28, 1990, abandoned, which is a continuation-in-part of Ser. No. 326,586, Mar. 21, 1989, abandoned.

[51] Int. Cl.$^5$ .............................................. G01C 9/20
[52] U.S. Cl. ..................................... 33/366; 33/377; 364/559; 340/689
[58] Field of Search ............... 33/366, 377; 364/559; 340/689

[56] References Cited

U.S. PATENT DOCUMENTS

| H416 | 1/1988 | Colvin ............................... 361/401 |
|---|---|---|
| 2,936,411 | 5/1960 | Doty ..................................... 33/366 |
| 4,077,132 | 3/1978 | Erickson ............................. 33/366 |
| 4,167,818 | 9/1979 | Cantarella et al. ................ 33/366 |
| 4,470,098 | 9/1984 | Alexander .......................... 361/321 |
| 4,521,973 | 6/1985 | Wiklund et al. .................... 33/366 |
| 4,528,760 | 7/1985 | Plummer ............................. 33/366 |
| 4,574,491 | 3/1986 | Vining ................................. 33/366 |
| 4,606,132 | 8/1986 | Briney et al. ....................... 33/366 |
| 4,622,619 | 11/1986 | Schilling et al. .................. 361/306 |
| 4,628,612 | 12/1986 | Hori et al. .......................... 33/366 |
| 4,644,662 | 2/1987 | Anderson et al. ................. 33/366 |
| 4,703,315 | 10/1987 | Bein et al. ......................... 340/689 |
| 4,774,279 | 9/1988 | Kohm ................................. 524/509 |
| 4,912,662 | 3/1990 | Butler et al. ...................... 364/559 |

FOREIGN PATENT DOCUMENTS

| 64-9309 | 1/1989 | Japan ................................... 33/366 |
|---|---|---|
| 8704515 | 7/1987 | United Kingdom ................ 33/366 |
| 2204136 | 11/1988 | United Kingdom ................ 33/366 |

Primary Examiner—William A. Cuchlinski, Jr.
Assistant Examiner—Alvin Wirthlin
Attorney, Agent, or Firm—Skjerven, Morrill, MacPherson, Franklin & Friel

[57] ABSTRACT

A capacitive type, multi-electrode inclination sensor device utilizes a conductive fluid acting as a common capacitive electrode contained within a cylindrical cavity. Two or more coplanar sensor electrodes are covered by a thin dielectric film and are mounted on an end wall of the cavity. Each insulated electrode forms one plate of a capacitive element with the conductive fluid forming the other plate. The geometry of the sensor electrodes is such that for a given physical position of the device (such as level or plumb), equal conductive fluid coverage of a given pair of sensor electrodes occurs, yielding two identical value capacitances. Any inclination of the device within the plane of the capacitive plates then increases one capacitance's value while decreasing the other, with the differential change in capacitance being proportional to the angle of inclination.

9 Claims, 18 Drawing Sheets

EQUAL COVERAGE
(LEVEL ASSEMBLY)

UNEQUAL COVERAGE
(UNLEVEL ASSEMBLY)

A

B

C

D

ELECTRONIC CAPACITANCE LEVEL WITH AUTOMATIC ELECTRODE SELECTION

This application is a continuation of application Ser. No. 07/486,643, filed Feb. 28, 1990, which is a continuation-in-part of application Ser. No. 07/326,586, filed Mar. 21, 1989, both now abandoned.

BACKGROUND OF THE INVENTION

1. Field of the Invention

The invention relates to an inclination measuring method and device for measurement of angles relative to a horizontal plane. The invention in particular relates to a sensing method and device using electrical capacitance to measure angles.

2. Description of the Prior Art

A number of known inclination measurement devices utilize a fluid or fluids in a chamber with two or more electrodes that are partially covered by the fluid(s), with the covered electrode areas being dependent upon the angle of inclination. Such devices are typically a conductive type or capacitive type. In a conductive type device, the fluid has a specific conductivity, and as the contact area between the fluid and a pair of electrodes varies, the resistance between the two electrodes varies. The fluid in this case must electrically contact both electrodes for proper operation and the conductivity of the fluid must be carefully controlled for repeatable performance. In a capacitive type of device 1 (see FIG. 1), a highly dielectric (i.e., non-conductive) type fluid 2 is used. As the fluid-covered (i.e., wetted) area of two electrodes 4,6 is varied, the electrical capacitance C across the two electrodes 4,6 varies, with the change in capacitance varying with the angle $\phi$ of inclination. To obtain reasonable values of capacitance, either the electrode 4,6 surface areas must be large or the spacing g between the electrodes 4,6 must be small. This requires either a large assembly or, for minimal electrode spacing g, difficult-to-obtain close manufacturing tolerances and problematic fluid meniscus effects. Thus the prior art capacitive sensors have significant drawbacks in terms of manufacturing, size and/or accuracy.

These drawbacks also exist in other prior art devices using a matched pair of sensor electrodes in a dielectric fluid with each electrode being in opposition to a common electrode. In these devices the capacitance between the first sensor electrode and the common electrode is compared to the capacitance between the second sensor electrode and the common electrode, and the difference in the two capacitances indicates the inclination of the device.

SUMMARY OF THE INVENTION

The present invention overcomes these prior art deficiencies by utilizing, in one embodiment, a thin film of insulating material over a coplanar electrode pair to form a capacitive dielectric, and by using a conductive fluid electrically contacting a third, common electrode, with the fluid forming a common capacitive electrode. The two capacitors formed by this configuration thus have a differential capacitance that is linear with the angle of inclination, the angle being related to the relative areas of the two electrodes which the conductive fluid covers (i.e., the relative wetted areas of the two electrodes).

The capacitive sensor in accordance with this invention differs from a prior art variable dielectric capacitor in that the fluid introduced between the plates is electrically conductive, with one of the two plates of any given capacitive element insulated from the fluid by a dielectric layer The fluid thus serves as a conductive liquid capacitor "plate", which is a unique feature of the invention.

A capacitive type inclinometer sensor in one embodiment of the invention includes at least two coplanar sensor electrodes formed on one end wall of a cylindrical cavity with at least one common electrode (for electrically contacting the conductive fluid) formed on the other end wall of the cavity or alternatively on the interior circular wall of the cavity. The cavity is partially filled with a conductive fluid with the remainder of the volume containing air The sensor electrodes are dielectrically isolated from the conductive fluid by the dielectric insulating film, with the common electrode electrically contacting the conductive fluid. In one embodiment, the sensor electrodes consist of four quadrant-shaped conductive plates of equal area with a gap between them. When the fluid equally covers two of the sensor electrodes, two equal value capacitors are formed.

As the assembly is rotated in the plane defined by the sensor electrodes, unequal sensor electrode areas are covered by the fluid causing unequal sensor capacitance that is proportional to the angle of rotation, yielding a measure of inclination. This arrangement allows sensing of the inclination of the assembly while utilizing zero differential capacitance on a selected pair of sensor electrodes.

In another embodiment, the sensor electrodes are two semicircular plates, both with equal areas. In this embodiment of the invention, the sensor electrodes provide an indication that the sensor is level (two equal value capacitors) or not level (unequal value capacitors). A similar sensor electrode assembly, rotated 90° relative to the plane of the first sensor indicates plumb or not plumb, so that the two sensors together, fixed to a frame, make up a familiar carpenter's level type of device.

Alternatively, either the two or four sensor electrode versions can be used to indicate any measure of inclination in degrees The present invention also includes a one sensor electrode embodiment, whereby absolute, not differential, capacitance is measured.

In any of the above embodiments, conventional indicating means (such as for example, a bell, tone, light, or digital readout) is used to provide an audio and/or visual indication of level, plumb, or of the angle of inclination expressed in degrees or otherwise.

Utilizing a null condition of two differential signals from two sensor electrodes to indicate a level condition eliminates error sources which equally affect the two signals. That is, any common mode error source is eliminated.

Since the invention uniquely uses an insulated capacitive sensor with a conductive fluid, the fluid conductivity has little effect on the sensor operation. This is due to the insulation resistance of the capacitive bridge dielectric insulating film being magnitudes larger than the fluid conductivity. The dominant factor is then the capacitive insulation resistance.

DETAILED DESCRIPTION OF THE INVENTION

Figure 1:
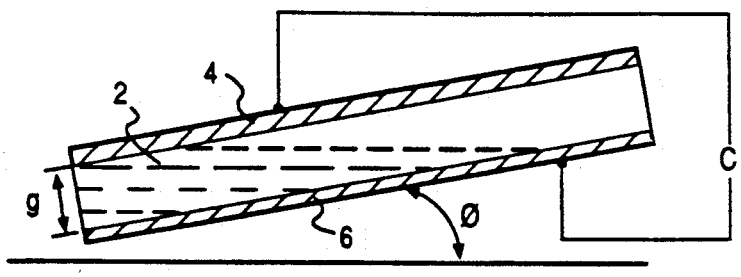
FIG. 1 shows a prior art capacitive sensor.
Figure 2A:
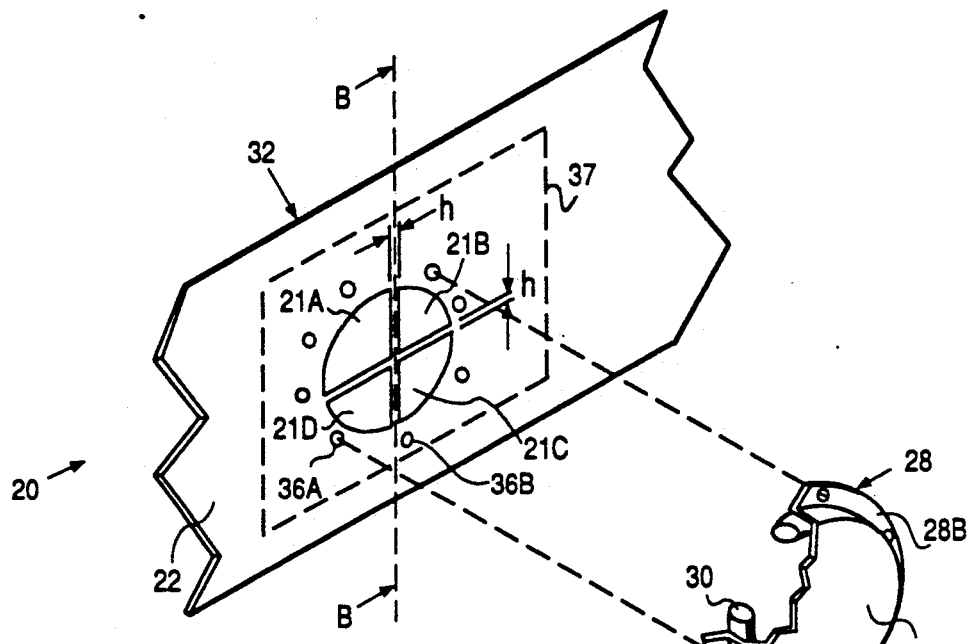
FIG. 2A is an exploded view of one embodiment of the invention.
Figure 2B:
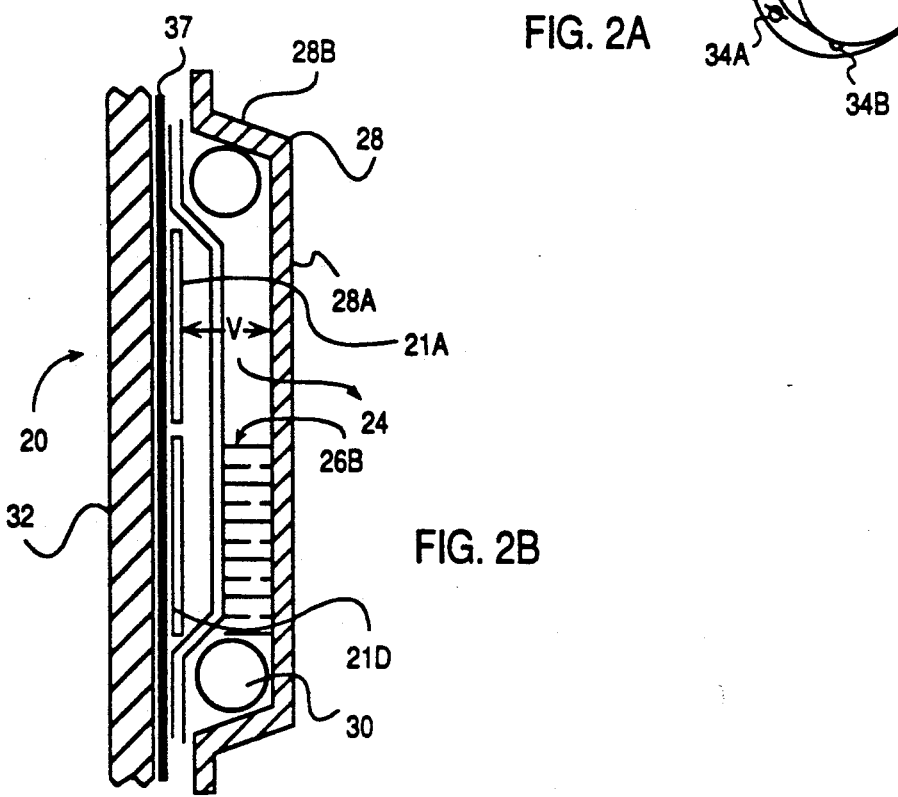
FIG. 2B is a cross section view of the sensor assembly shown in FIG. 2A through line B—B in FIG. 2A.

The basic sensor assembly 20 (see exploded view FIG. 2A) consists of four identical co-planar sensor electrode plates 21A, 21B, 21C, 21D arranged in quadrants. The sensor plates 21A, 21B, 21C, 21D are covered with a thin dielectric film 22 (see FIG. 2B for an assembled cross sectional view of assembly 20 through line B—B of FIG. 2A) and form an end wall of a cavity 24 that partially contains a conductive fluid 26. The main body of the cavity 24, that is the remaining end wall 28A and the cylinder wall 28B, are formed by a metal cup 28 which electrically contacts the conductive fluid 26, acting as a common electrode, as well as completing a sealed container for the fluid 26. An O-ring 30 contained by the circular walls 28B of the metal end cup 28 ensures the container seal. Sensor plates 21A, 21B, 21C, 21D are conventionally formed by etching a copper layer deposited on a piece of laminated printed circuit board 32. The level of fluid 26 is shown at 26B. In FIG. 2B, for purposes of clarity of the drawing, sensor electrodes 21A, 21D are shown slightly separated from printed circuit board 32. In one embodiment, there is no such separation. Similarly, in this embodiment, dielectric film 22 is in direct contact with sensor electrodes 21A, 21D, with no separation between dielectric film 22 and sensor electrodes 21A, 21D.

Conductive fluid 26 is a mixture of alcohol and water, with 1% to 30% water and the rest alcohol. The proportion of water is 1% in one embodiment. Cavity 24 is 45% filled with fluid 26. The rest of cavity 24 is filled with air although an inert gas such as nitrogen can also be used.

Gap "h" (see FIG. 2A) between sensor plates such as 21A and 21B is, in one embodiment, about 0.020 inches (0.5 mm). Sensor electrodes 21A, 21B, 21C, 21D have a combined diameter of about 0.25" to 2" (0.6 cm to 5 cm) in this embodiment. Gap "V" (see FIG. 2B) between sensor electrodes 21A, 21B, 21C, 21D and common electrode metal cup 28 is, in one embodiment, about 0.150ə" (3.8 mm). Naturally the dimensions of the sensor electrodes 21A, 21B, 21C, 21D and of the gaps "h" and "V" can vary as desired and appropriate. Metal cap 28 is fastened to printed circuit board 32 by means of conventional fasteners (such as rivets, not shown) which pass through the holes 34A, 34B, etc. in cylinder wall 28B of metal cap 28 and into corresponding holes 36A, 36B, etc. in printed circuit board 32.

Alternate embodiments of the sensor electrodes 21A, 21B, 21C, 21D include forming them by conductive ink printed on an insulating substrate, or using conventional flex circuits (flexible insulating material on which is formed conductors) for the sensor electrodes 21A, 21B, 21C, 21D.

Dielectric film layer 22 is preferably a layer about 0.0005" to 0.005" (0.013 mm to 0.13 mm) thick of conventional solder mask material, formed over electrodes 21A, 21B, 21C, 21D. Other insulators (such as Mylar a or a similar flexible polyester sheet) may also be used for the dielectric layer 22. In the case of the flex circuit sensor electrode embodiment, Kapton ® (or a similar flexible polyamide sheet) is a suitable dielectric layer.

Figure 3A:
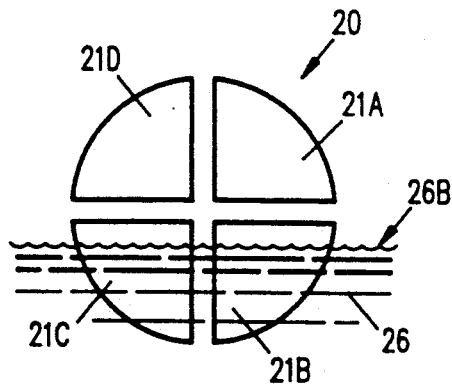
FIGS. 3A and 3B show the operation of one embodiment of the operation.
Figure 3B:
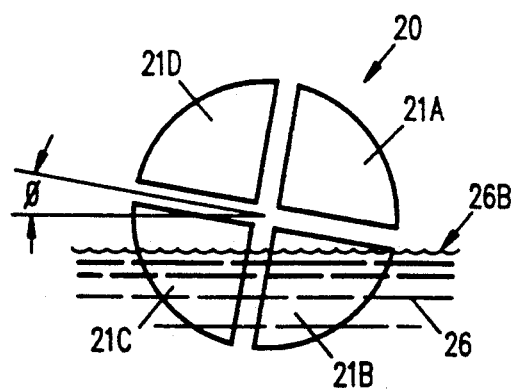

Four capacitors are formed by this assembly 20: from each of the four sensor electrode quadrants 21A, 21B, 21C, 21D to the common electrode 28 via the conductive fluid 26 If the gaps between the electrodes 21A, 21B, 21C, 21D are horizontal and vertical to the gravitational reference plane, (see FIG. 3A) the conductive fluid 26 will then equally cover to fluid level 26b the two 'lower' electrodes such as 21B and 21C in FIG. 3A. Any rotation (as in FIG. 3B) of the sensor assembly 20 within the plane of the electrodes 21A, 21B, 21C, 21D will then cause the area covered by the fluid 26 to decrease on one of the 'lower' electrodes 21C and increase on the other electrode 21B. This, in turn, will cause an imbalance in the capacitance of the two lower electrodes 21B, 21C, with the amount of capacitive imbalance being proportional to the angle of rotation φ (or inclination) away from a 'level' position. Electrodes 21A, 21B, 21C, 21D are, in one embodiment of the invention, quadrant shaped as shown in FIG. 2A. Alternatively electrodes 21A, 21B, 21C, 21D are triangular in shape, i.e., instead of being a 90° section of a circle, each sensor electrode is, for example, a 30° section of a circle The electrode shape is not a critical feature of the invention. The electronics circuitry provided in one embodiment of the invention then senses this balanced or unbalanced differential capacitance and suitably indicates the state to the user.

Figure 4A:
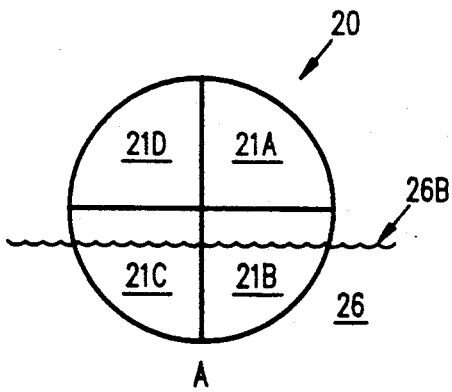
FIGS. 4A to 4D show four positions of the embodiment of FIGS. 3A and 3B.
Figure 4B:
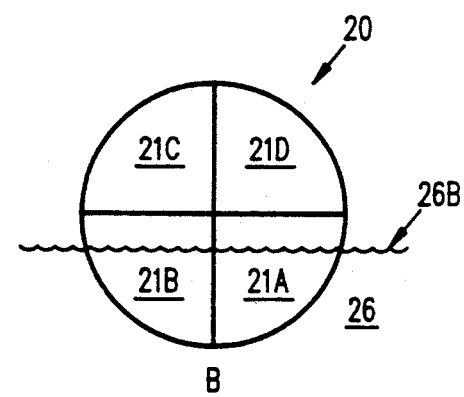
Figure 4C:
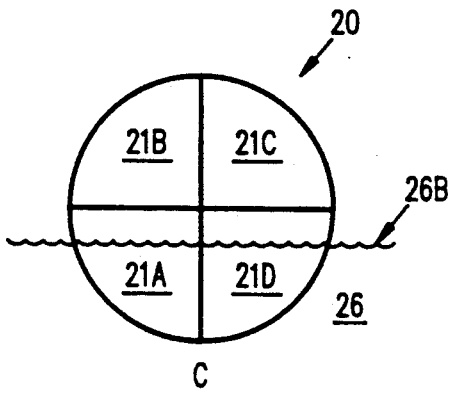
Figure 4D:
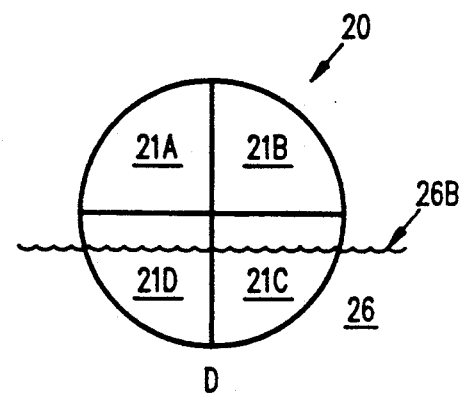

The sensor assembly 20 is utilized to indicate a level condition in any one of four different positions, shown in FIGS. 4A to 4D with the sensor electrodes 21A, 21B, 21C, 21D. The gaps between sensor electrodes 21A, 21B, 21C, 21D are not shown in FIGS. 4A to 4D for simplicity. No pair of diagonal electrodes such as 21A and 21C or 21B and 21D are 'active' at the same time, where the electrode pair partially covered by the fluid 26 is considered to be active; for example, electrodes 21B and 21C are active in FIG. 4A. In FIG. 4A, of the diagonal electrode pair 21A and 21C, 21C is active and 21A is not. Likewise 21B is active and 21D is not. In each of the four level positions, either 21A or 21C is active, but never both, and similarly 21B or 21D is active, but never both. "Level" as used here generally means both (1) level in the exact sense of perpendicular to the direction of gravity and (2) plumb, that is, parallel to the direction of gravity. This condition is used to select automatically the appropriate active electrode pair for any of the four level positions possible.

While any active electrode pair is partially covered by the conductive fluid 26, the inactive electrode pair is not covered at all. Thus the capacitance of the active electrodes is substantially greater than that of the inactive ones. This feature, combined with the diagonal exclusivity previously discussed, allows electronic logic circuitry in accordance with the invention to select the active electrode pair to indicate the inclination of sensor assembly 20, as described in detail as follows.

Figure 5:
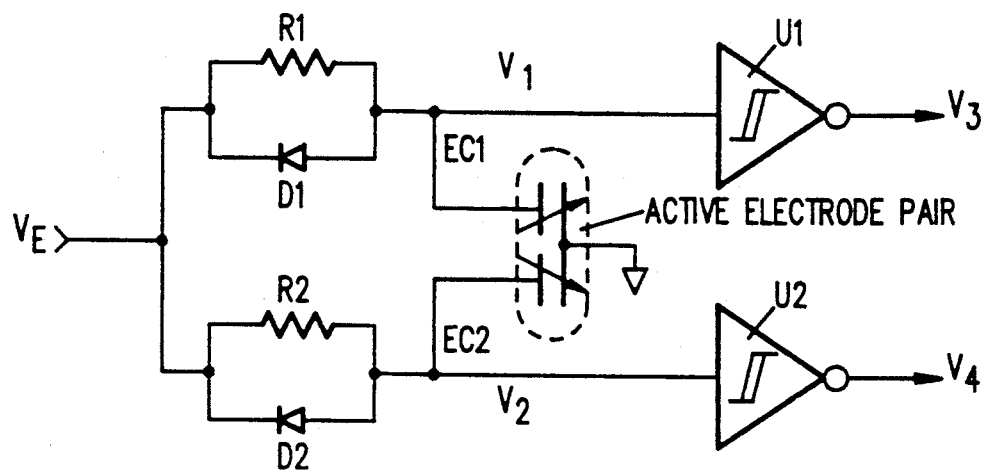
FIG. 5 is a simplified electrical schematic of the sensor assembly electronics interface of one embodiment of the invention.

The electronics circuitry in accordance with the invention uses the charge time of an R-C circuit, with the C (capacitance) being formed chiefly by the sensor electrode capacitances. By comparing the charge times of the various sensor electrodes, the position of the assembly can be determined. FIG. 5 shows a simplified circuit diagram of the sensor electronics circuitry for purposes of illustration.

The provided excitation voltage, $V_E$, (preferably a conventional square wave) charges the sensor electrode capacitors EC1 and EC2 through resistors R1 and R2 when the voltage is high. EC1 for example is the capacitor formed by sensor electrode 21B and common electrode 28; EC2 for example is the capacitor formed by sensor electrode 21C and common electrode 28, of FIG. 3A. If the two capacitors EC1, EC2, (see FIG. 5) which include an active pair of sensor electrodes, are matched (i.e., are of equal value as when the sensor assembly 20 is level) and the two resistors R1, R2 are matched, then the voltages $V_1$ and $V_2$ will both have identical voltage versus time characteristics and both $V_1$ and $V_2$ will reach the upper voltage threshold of the conventional Schmitt triggers (i.e., logic gates) U1 and U2, at the same time. The output signals of Schmitt triggers U1 and U2 will then go to zero at the same time. If, however, the two electrode capacitors EC1, EC2 are not the same value (i.e., the sensor assembly 20 is not level) then the side of the sensor assembly 20 with the lower capacitance will charge quicker and reach the Schmitt trigger U1 or U2 threshold voltage before the other side of sensor assembly 20 does so. The output signals from the Schmitt triggers U1, U2 will then not fall at the same time and this effect is used to indicate an out-of-level condition. This charging time differential is shown in FIG. 6.

Both electrode capacitors EC1, EC2 are quickly discharged by diodes D1 and D2 when the excitor voltage, $V_E$, goes from high to low. Voltage $V_E$ is low for a longer time than it is high (see FIG. 6) to ensure that the capacitors EC1, EC2 are fully discharged before starting a new cycle. The diodes D1, D2 provide almost all of the discharge in a very short period of time with the resistors R1, R2 providing a more long term complete discharge after the diodes D1, D2 are no longer in forward conduction (i.e., when the capacitor EC1, EC2 voltages decrease below about 0.5 volts).

Figure 6:
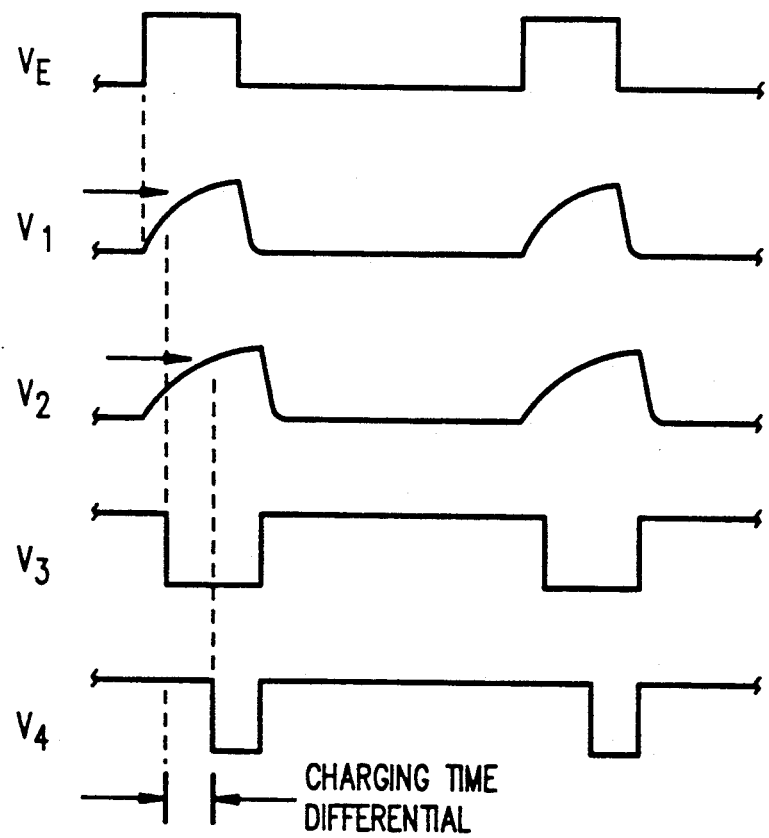
FIG. 6 shows waveforms associated with the circuit of FIG. 5.

FIG. 6 shows waveforms representing voltages vs. time at points $V_E$, V1, V2, V3, and V4 as shown in FIG. 5. In FIG. 6, excitor voltage $V_E$ is shown as a series of periodic voltage pulses, with each pulse being shorter in duration than the time between pulses. Voltages V1, V2 (the input signals to respectively Schmitt triggers U1, U2) thus are shown as rising and falling with $V_E$. Voltages V3 and V4 (the output signals of respectively Schmitt triggers U1,U2), are shown as falling at a time difference delta, which indicates the out of level condition.

In one embodiment of the invention (see FIG. 7), the Schmitt triggers U1, U2 are dual input NAND gate types, with each of the two NAND input terminals being a Schmitt trigger input terminal. A NAND (or NOT AND) gate conventionally logically functions according to the following truth table:

| Input | | Output |
| --- | --- | --- |
| A | B | |
| 0 | 0 | 1 |
| 0 | 1 | 1 |
| 1 | 0 | 1 |
| 1 | 1 | 0 |

That is, both input signals must be a '1' before the output signal will go to '0'.

As stated above, in this embodiment of the invention:
1. No diagonal electrode pair is active at the same time;
2. Non-active electrodes will charge to the Schmitt trigger U1,U2 lower threshold voltage more rapidly than do active electrodes.

Figure 7:
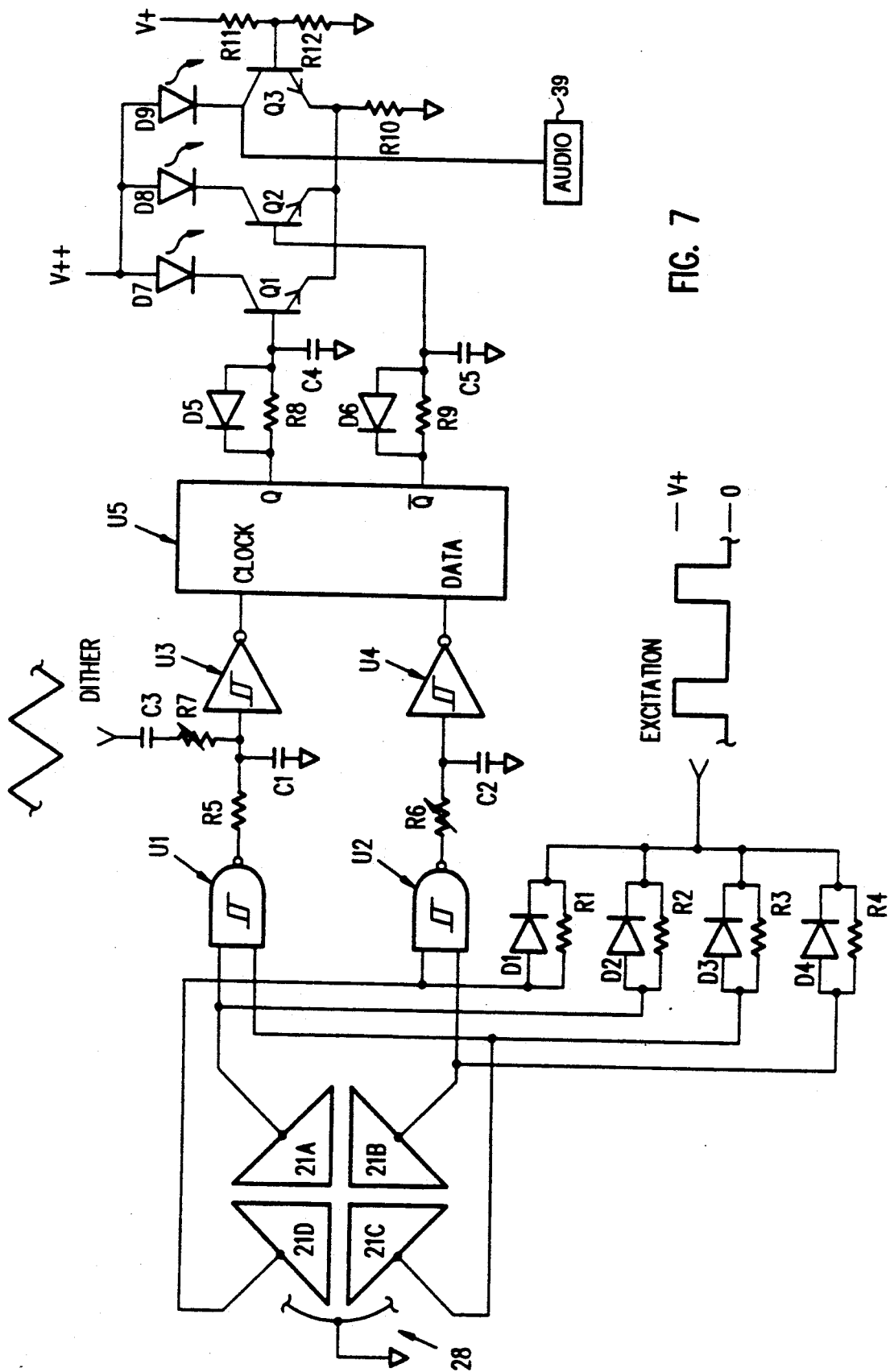
FIG. 7 is a more detailed electrical schematic of the embodiment of FIG. 5.
Figure 8:
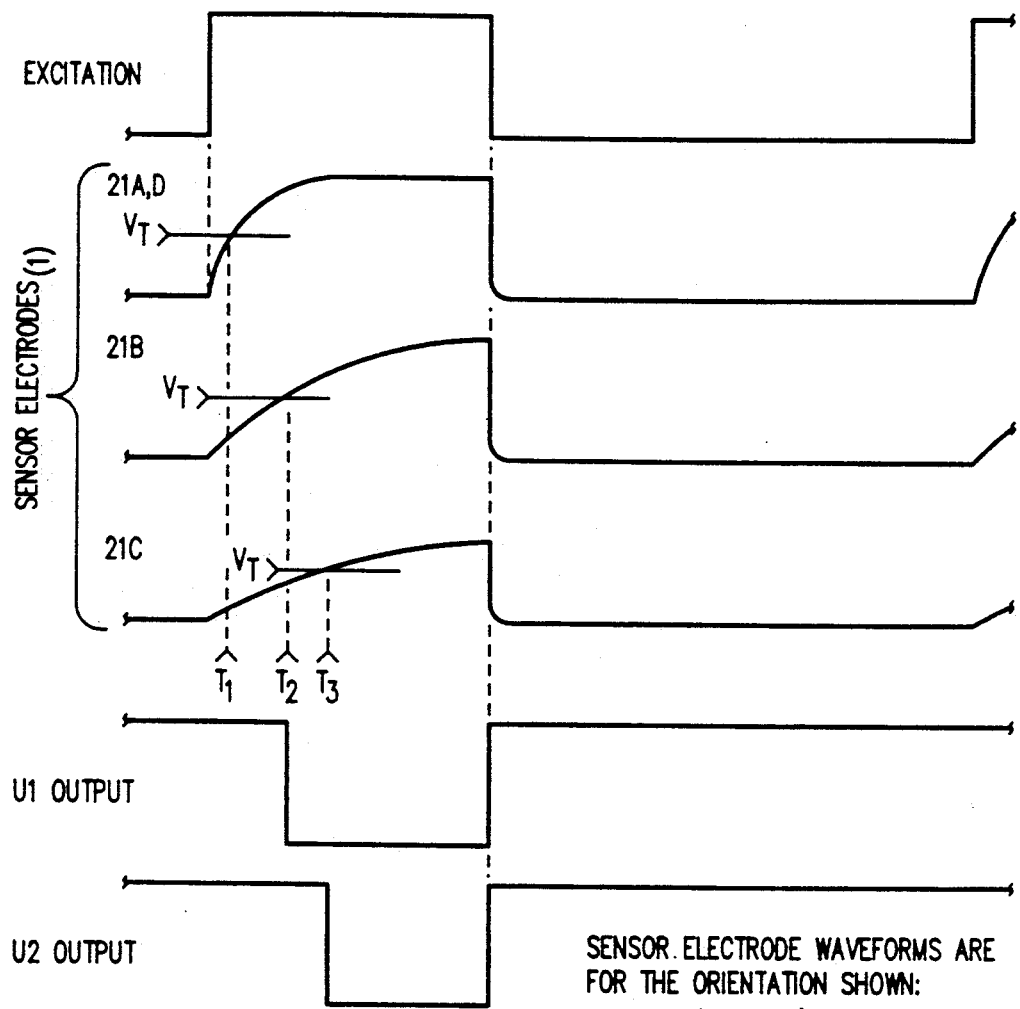
FIG. 8 shows electrical wave forms associated with the circuit of FIG. 7.
Figure 8A:
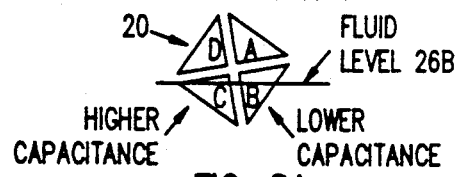

The schematic of FIG. 7 shows the sensor assembly interface circuitry in accordance with this embodiment of the invention. FIG. 7 shows additional detail not included in the simplified schematic shown in FIG. 5. The waveforms related to FIG. 7 are shown in FIG. 8. FIG. 7 shows how the active pair of electrodes is selected. A given pair of diagonal electrodes (for example, 21A and 21C) are connected to the input terminals of one of the Schmitt input NAND gates U1, U2. In the physical position shown (21B and 21C being active elements) sensor electrode 21A will reach the threshold voltage VT before electrode 21C, and when electrode 21C (the active element of the diagonal electrode pair 21A, 21C) does reach the threshold voltage $V_T$, the output signal of gate U1 will go to zero. Similarly, electrode 21D will reach the threshold voltage $V_T$ before electrode 21B. The two active electrodes, 21B and 21C, are then controlling when the output signals of the gates U1, U2 go to zero. The non-active electrodes, 21A and 21D, have already reached the threshold voltage at time T1 and are waiting for electrodes 21B and 21C to 'catch up' at times T2 and T3. The other positions of the sensor assembly 20 as shown in FIGS. 4A through 4D operate in a similar manner.

The two sensor electronics output signals of gates U1 and U2 (see FIG. 7) are processed as follows to provide meaningful information for the user of the device. The two output signals from U1 and U2 are respectively the data and clock inputs of a conventional D-type flip-flop U5. First, the clock signal is inverted, as the flip-flop U5 clocks, or triggers, on the rising edge of the clock signal and the sensor electronics output signal goes to zero, or falls, when the electrode voltage reaches threshold. Inverter U3 inverts the output signal of gate U1 to provide the desired polarity signal. Although the data input signal of the flip-flop U5 need not be inverted (since the Q and $\overline{Q}$ output signals of flip-flop U5 could simply be interchanged), the propagation delay of the clock signal path must be matched in the data signal path so that the clock and data signal edges will occur at the same time when the active electrode capacitances are equal. The clock signal is time delayed by the R-C network of resistor R5 and capacitor C1. A similar delay is formed in the data signal path due to resistor R6 and capacitor C2. Resistor R6 is a variable resistor so that the delay in the data path has a range that is both less than and greater than the clock signal delay and can be adjusted to exactly equalize the two paths.

If the clock signal precedes the data signal in time, the data input signal of the flip-flop U5 will be a zero when the clock signal edge occurs, leaving the flip-flop U5 in a logical zero state (i.e., Q=0, $\overline{Q}$=1). If the opposite condition exists (i.e., the data signal precedes the clock signal) then flip-flop U5 assumes the opposite state after the clock signal (i.e., Q=1, $\overline{Q}$=0). The output signals Q, $\overline{Q}$ of the flip-flop U5 thus indicate the sensor assembly's direction from level. No indication of a level condition exists yet, however, because even a very slight deviation from level may result in the clock and data signal edges not coinciding in time.

To provide an indication of level, a ten arc minute inclination 'window' is developed. This is done by 'dithering', or wiggling, the clock signal input to the flip-flop U5 with respect to the data signal.

Figure 9:
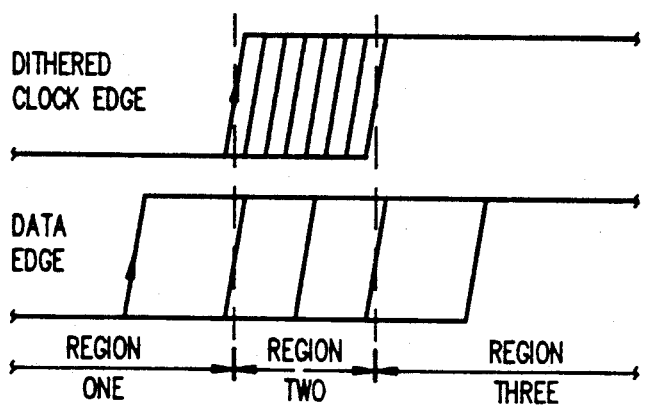
FIG. 9 shows the dithering window waveforms associated with the circuit of FIG. 7.
Figure 10A:
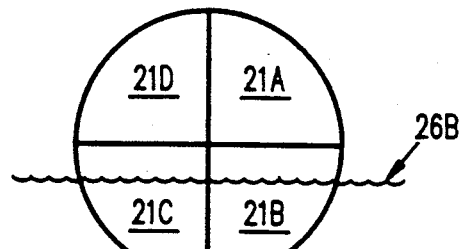
FIGS. 10A-10H depict eight rotational positions and the electrode pair relationships for each position of the sensor assembly in another embodiment of the invention.
Figure 10E:
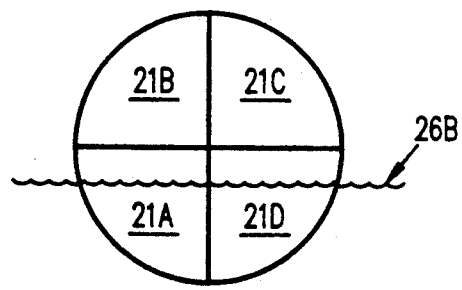
Figure 10B:
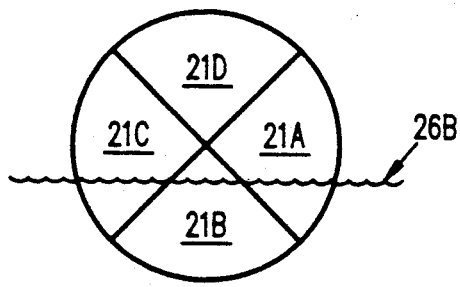
Figure 10F:
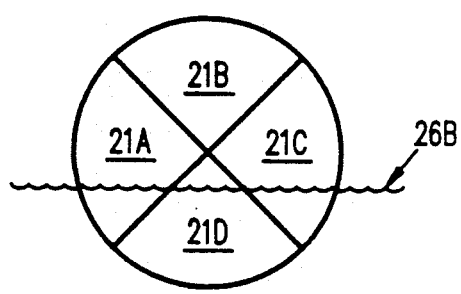
Figure 10C:
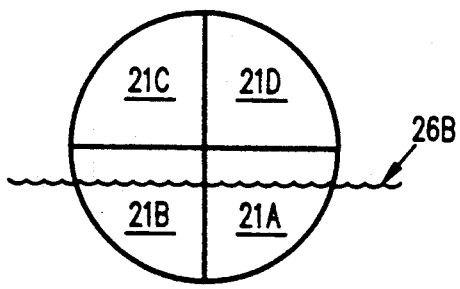
Figure 10G:
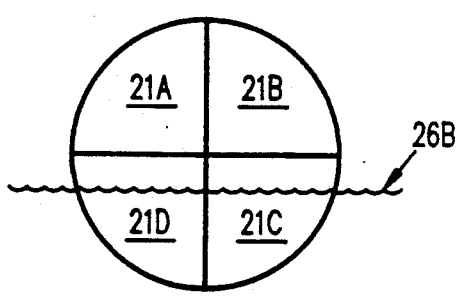
Figure 10D:
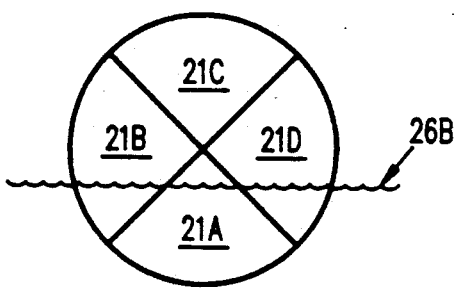
Figure 10H:
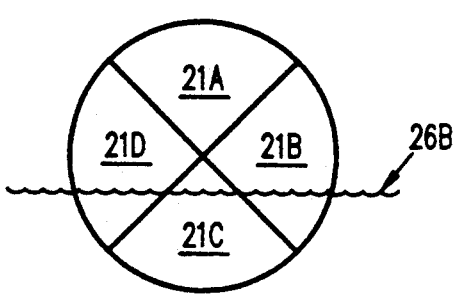

If the data signal to the flip-flop U5 is within the dithered window of the clock, the flip-flop U5 will continue to change state as the clock signal is early and then late with respect to the data signal. By adjusting the amount of time dither, a 10 arc minute inclination window is established. FIG. 9 illustrates this operation. If the data signal edge occurs in Region One, the flip-flop U5 will always be in a 1's state and if the data edge is in Region 3, the flip-flop U5 will always be in a 0's state. However, if the data edge occurs in Region Two, the clock signal edge will sometimes occur before the data signal edge and sometimes after, resulting in the flip-flop U5 repeatedly changing state. The dither frequency is completely independent and non-coherent with respect to the sensor excitation voltage $V_E$ frequency.

The preferred method of dithering the clock signal involves slightly modifying the delay time into the Schmitt gate U3 (see FIG. 7) with a sawtooth dither signal provided through resistor R7. The dither signal is alternating current coupled via capacitor C3 so that any average direct current in the dither signal will not affect the delay time. Resistor R7 is preferably a variable resistor so that the amount of dither signal injected may be adjusted.

To indicate a level condition (that is, the data signal edge is within the dithered window) the output signals (both Q and $\overline{Q}$) of the flip-flop U5 are filtered by constantly discharging the capacitors C4 and C5 through diodes D5 and D6, which keeps transistors Q1 and Q2 turned off. With transistors Q1 and Q2 off, transistor Q3 will be on, turning on a green level indicator LED D9 (light emitting diode) in the preferred embodiment. If the flip-flop U5 remains constant in either a 0 or 1 state, the appropriate capacitor (either C4 or C5) will charge through either resistor R8 or R9. As the base of either transistor Q1 or Q2 reaches the same voltage as Q3's base, Q1 or Q2 will start to turn on, and as the base voltage of Q1 or Q2 increases to 5 volts (the voltage on the output lead Q or $\overline{Q}$ from flip-flop U5 when these output leads have a high level signal), transistor Q3 will be turned off entirely. A conventional differential comparator circuit is provided including transistors Q1, Q2 and Q3, and collector loads comprised of LED's D7, D8 and D9. Each LED D7, D8, and D9 is connected to voltage supply V++ and also respectively connected to transistors Q1, Q2, and Q3, so that a sharp on-off transition occurs at the boundaries of the dither window, resulting in a clean 'snap' action of the indicator LED's Audio indicator 39 is also provided. Resistors R11 and R12 set the threshold voltage at which the change from a level to non-level indication occurs and resistor R10 sets the LED current. Note that only one LED D7, D8, D9 can be on at a time.

The values of the various resistors and capacitors shown in FIG. 7 are as follows in the preferred embodiment of the invention:

| Resistors | | Capacitors | |
|---|---|---|---|
| R1 | 100K ohms | C1 | 22 pF |
| R2 | 100K ohms | C2 | 22 pF |
| R3 | 100K ohms | C3 | .1 µF |
| R4 | 100K ohms | C4 | .1 µF |
| R5 | 2K ohms | C5 | .1 µF |
| R6 | 5K ohms (variable) | | |
| R7 | 50K ohms (variable) | | |
| R8 | 220K ohms | | |
| R9 | 220K ohms | | |
| R10 | 150 ohms | | |
| R11 | 10K ohms | | |
| R12 | 100K ohms | | |

FIGS. 10A through 10G depict eight rotational positions for the four sensor electrodes 21A, 21B, 21C, 21D and the surface 26B of conductive fluid 26 for another embodiment of the invention. By means of suitable electronically switched sensor electrode selection, the appropriate pair of sensor electrodes are utilized for output signal indication. For example in FIG. 10C the required electrode pair to measure inclination is 21A and 21B and in FIG. 10F the required electrode pair to measure inclination is 21A and 21C. The eight positions shown in FIGS. 10A to 10H thus provide an indication of level relative to the sensor assembly in 45° increments.

In yet another embodiment of the invention using two sensor electrodes, a conventional four element A.C. bridge is formed by the two capacitances of the sensor electrode assembly and two impedance elements which can be resistive, capacitive, inductive, or a combination thereof. The bridge is excited by an A.C. source. The two impedance elements have equal impedance. Then when the two sensor electrodes are equally covered by the conductive fluid, so that their capacitive values are equal, the A.C. voltages at two points in the bridge, each point being between one of the capacitive elements and one of the impedance elements, will be equal in phase and magnitude. A differential amplifier having these two A.C. voltages as its input signal will then have no output signal voltage.

When the sensor assembly is inclined so as to unbalance the two capacitances, the two A.C. voltages will be unequal, producing a voltage at the output terminal of the differential amplifier; this voltage will be proportional to the amount of inclination. The phase of the output signal of the differential amplifier will be in or out of phase with regard to the A.C. excitation source, and so the phase will depend on whether the angle of inclination is greater than or less than ninety degrees, thus providing information as to the direction of inclination from level.

The following describes other embodiments of the invention. One embodiment of the invention includes a machined or cast metallic housing which is the common electrode for the sensor assembly, and a conductive ring surrounding the dielectrically isolated, individual electrodes in the same plane, and electrically connected to the common electrode and electrically exposed to the conductive fluid. This significantly reduces initial sensor assembly inaccuracies due to a relative positioning shift between the sensor housing and the planar electrode assembly during assembly causing unequal volumetric path lengths through the conductive fluid from the area over the two isolated, wetted electrodes to the common electrode.

In addition, secondary errors induced by a change in fluid level are reduced by an electrode shape having straight sides rather than curved or circular. The insulating material covering the separate, sensing electrodes is polypropylene.

Additional stability benefits are provided by yet another embodiment having a ceramic substrate with metallic electrodes deposited on one surface and then covered with a glass-based material to form the dielectric in another embodiment. The conformal, glass dielectric coating will have a low adsorption and leakage rate via osmosis with the additional benefit of an excellent surface finish. The recovery time of the fluid within the sensor cavity after a physical disturbance (i.e., movement due to use) is subject to the surface finish of the dielectric. As the disturbed fluid flows down the face of the dielectric toward the majority of the fluid in the bottom of the reservoir, the time required depends upon the microscopic obstacles the fluid encounters on the dielectric surface in the form of surface deformities. Hence the smoother the surface, the more rapid and consistent the recovery time.

Figure 11A:
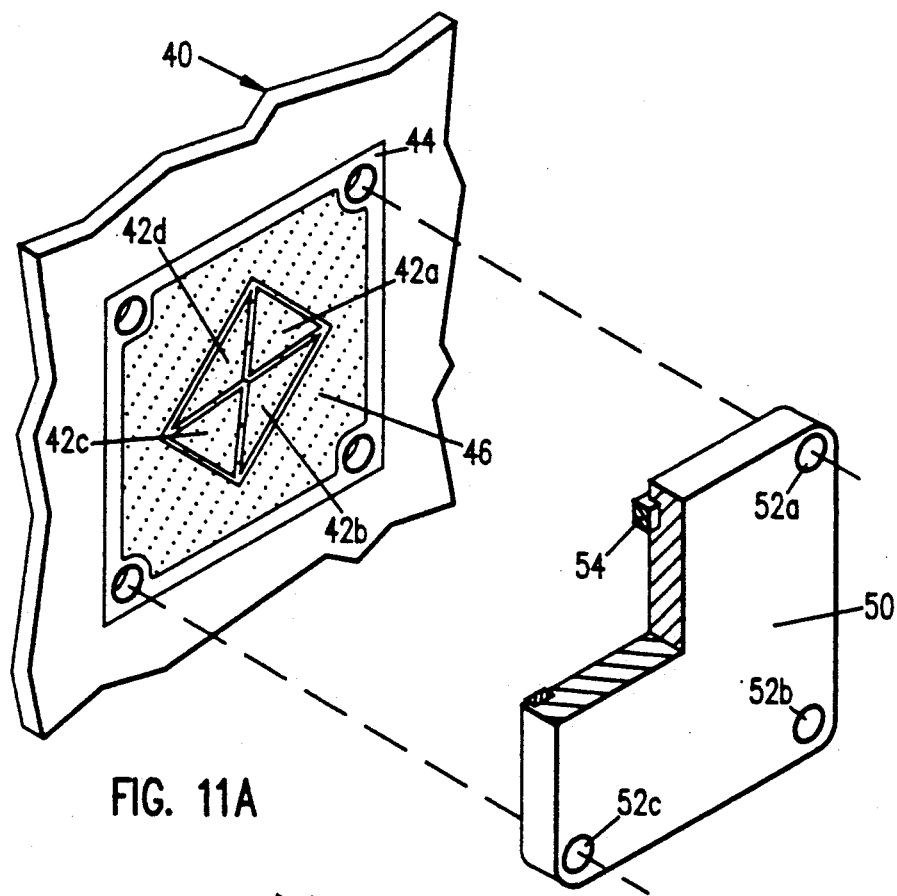
FIG. 11A shows an exploded view of a sensor assembly.

FIG. 11A shows an exploded view of a sensor assembly including circuit board 40 with an etched sensor pattern with straight-sided sensor electrodes 42a, 42b, 42c, 42d and conductive ring 44 which when assembled is covered with polypropylene film 46 as a dielectric. A metal cover 50 (shown partially cut away) is fastened to circuit board 40 by screws through mounting holes 52a, 52b, 52c. Metal cover 50 is machined or die cast from aluminum or zinc alloy. O-ring 54 is held in a groove (not shown) in metal cover 50. A second metal cover (not shown) is provided on the backside of substrate 40, having threaded holes mating with the mounting holes in metal cover 50.

Figure 11B:
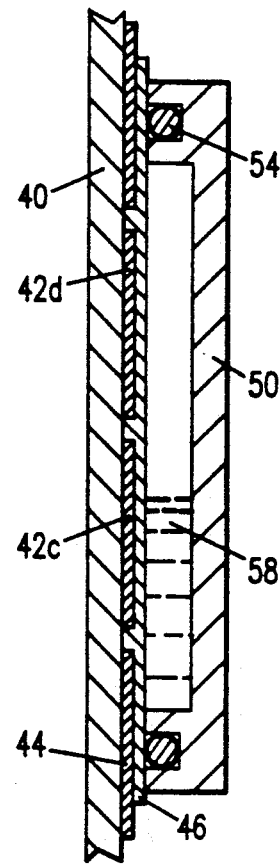
FIG. 11B shows a cross section of the sensor assembly of FIG. 11A.

FIG. 11B shows a cross section of the sensor assembly of FIG. 11A. Shown are substrate (circuit board) 40, electrodes 42c, 42d, common conductive ring 44, metal cover 50, O-ring 54, dielectric film 46, and conductive fluid 58. Conductive fluid 58 is 99% anhydrous isopropyl alcohol and 1% water.

Figure 12A:
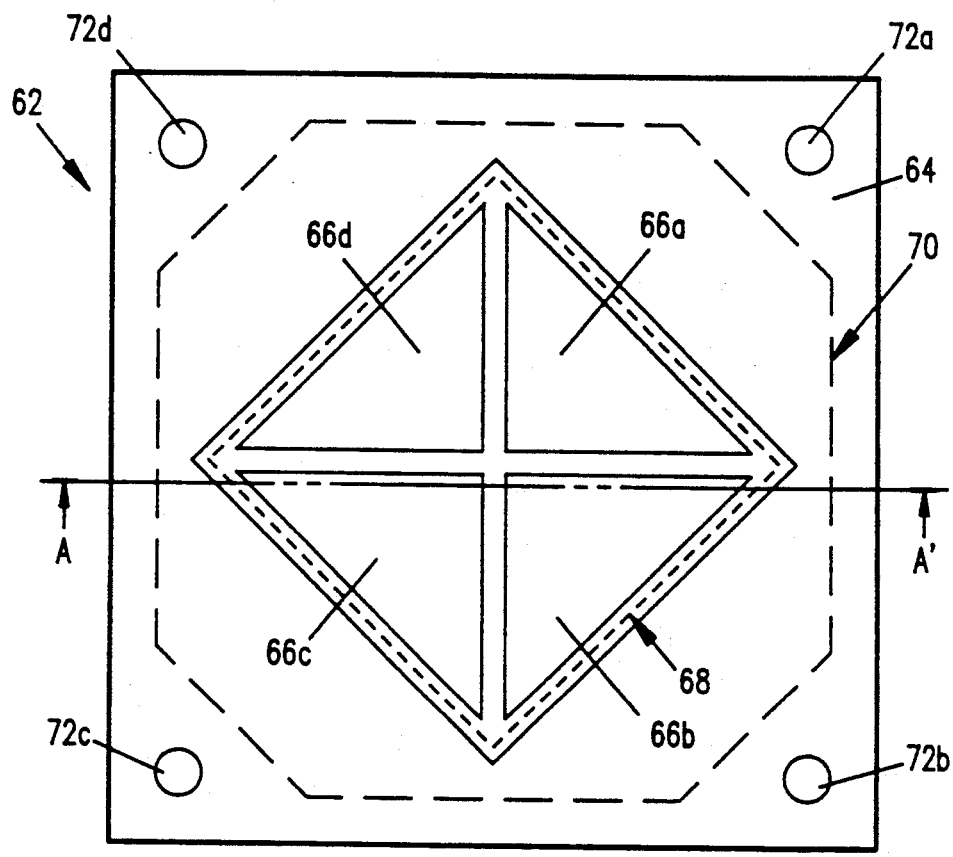
FIG. 12A shows a substrate of another sensor assembly.

FIG. 12a shows another sensor assembly also in accordance with the invention as described above using a ceramic substrate with deposited thick film electrodes and a glass-based dielectric. Shown are ceramic substrate 62 with common ring metallization 64 deposited thereon and electrodes 66a, 66b, 66c, 66d, deposited thereon. The dielectric 68 is glass-based and its outer periphery is shown by a dotted line, so it covers electrodes 66a, 66b, 66c, 66d. The second dotted line shows to where the boundary of the inner wall of the metal cover 70 extends. Holes 72a, 72b, 72c, 72d are provided to fasten substrate 62 by screws (not shown) which extend into matching threaded holes in metal cover 70.

Figure 12B:
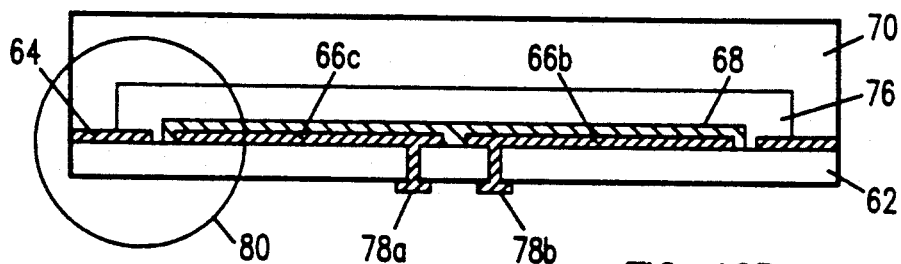
FIGS. 12B, 12C show cross sections of the sensor assembly of FIG. 12A.

FIG. 12B shows a cross section through line A—A' of FIG. 12A. Shown are metal cover 70, fluid reservoir 76, and substrate 62. Also shown are via holes 78a, 78b for electrode connections to electrode 66c, 66b, respectively.

Figure 12C:
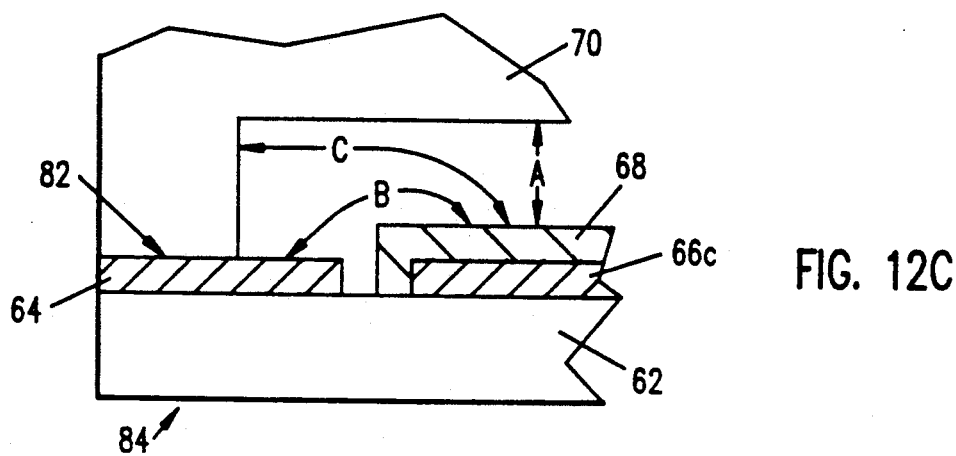

FIG. 12C shows an enlarged view of the circled area 80 in FIG. 12B. Shown are metal cover 70, common ring 64, electrode 66c, dielectric 68, and substrate 62. Distance A is 0.030 inches (0.76 mm), and distance B is 0.015 to 0.020 inches (0.38 to 0.51 mm). The advantage of this structure is that a slight misalignment of cover 70 on substrate 62, affecting distance C, will not alter the accuracy of the instrument. In this embodiment, cover 70 is sealed to substrate 62 at location 82 by eutectic solder or alcohol impervious epoxy, and no second metal cover is needed on the backside 84 of substrate 62.

In one embodiment individual, differential input voltage comparators are used instead of Schmitt triggers. This allows use of a single voltage reference for comparison with the electrode signals, thus providing a common reference level whose voltage is not pre-established as in the case of the Schmitt trigger's, but is individually tailored to yield optimum performance. In addition, the amplitude "dither" voltage utilized to establish a known band of level or plumb condition is injected along with the reference voltage into the appropriate comparators. Utilizing a single stage to convert from the analog output of any sensor element to a digital type signal for subsequent processing is advantageous.

Additionally, the individual reference inputs to the comparators are further utilized as calibration points. By slightly varying the individual reference voltage inputs by means of potentiometers, digital to analog networks, or other means, each operating position of the sensor unit is individually calibrated. By selecting the topography of the calibration network, environmental effects (such as temperature) seen differentially between any two active comparators are reduced.

Further initial and environmental offsets are reduced through elimination of the discharge diodes. These diodes, through mismatching and non-tracking environmental effects, may undesirably add variable offsets to the system. By utilizing an excitation signal with much longer discharge times than charge times but still allowing sufficient charge time for proper operation, the extended discharge time insures complete capacitive sensor element discharge prior to the next charge cycle without the use of the diodes.

Figure 13:
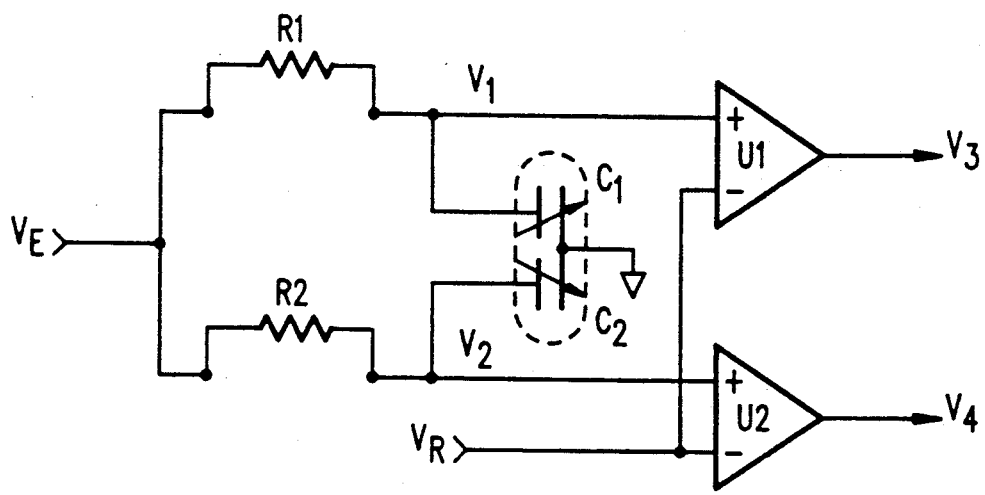
FIG. 13 shows a simplified schematic of one embodiment of the invention.
Figure 14:
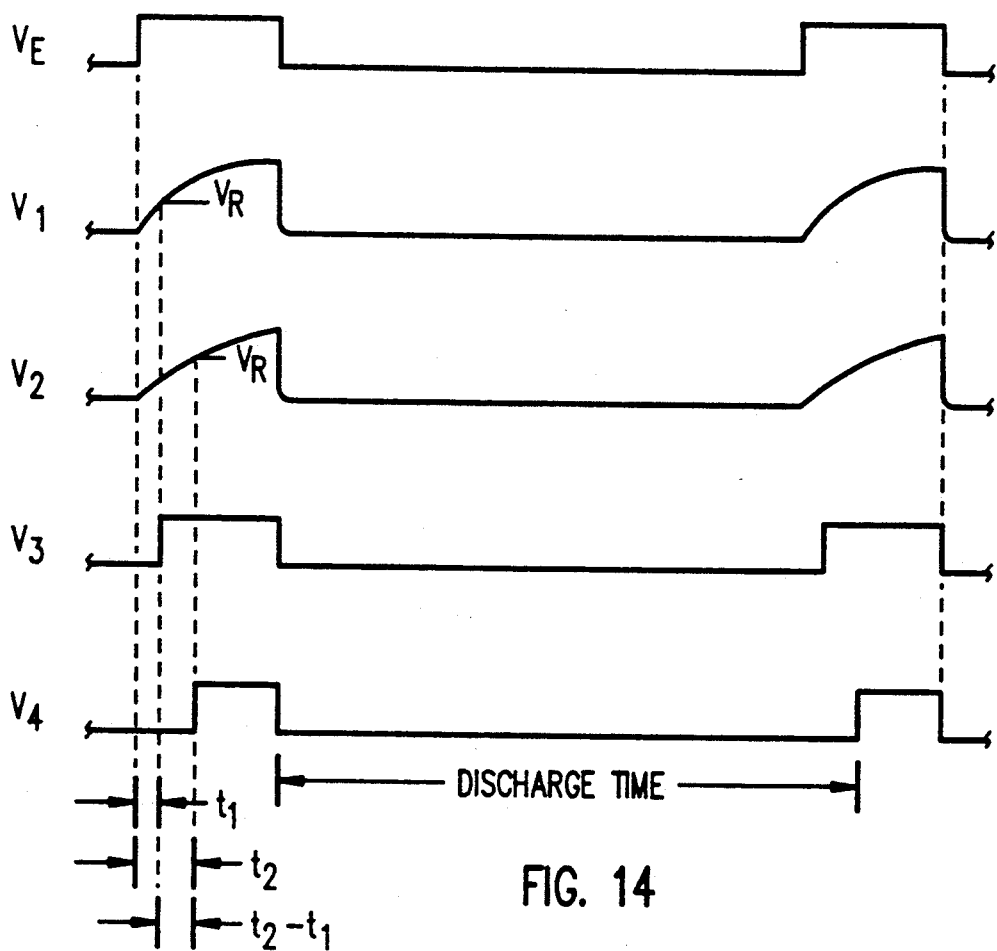
FIG. 14 shows waveforms associated with FIG. 13.
Figure 15:
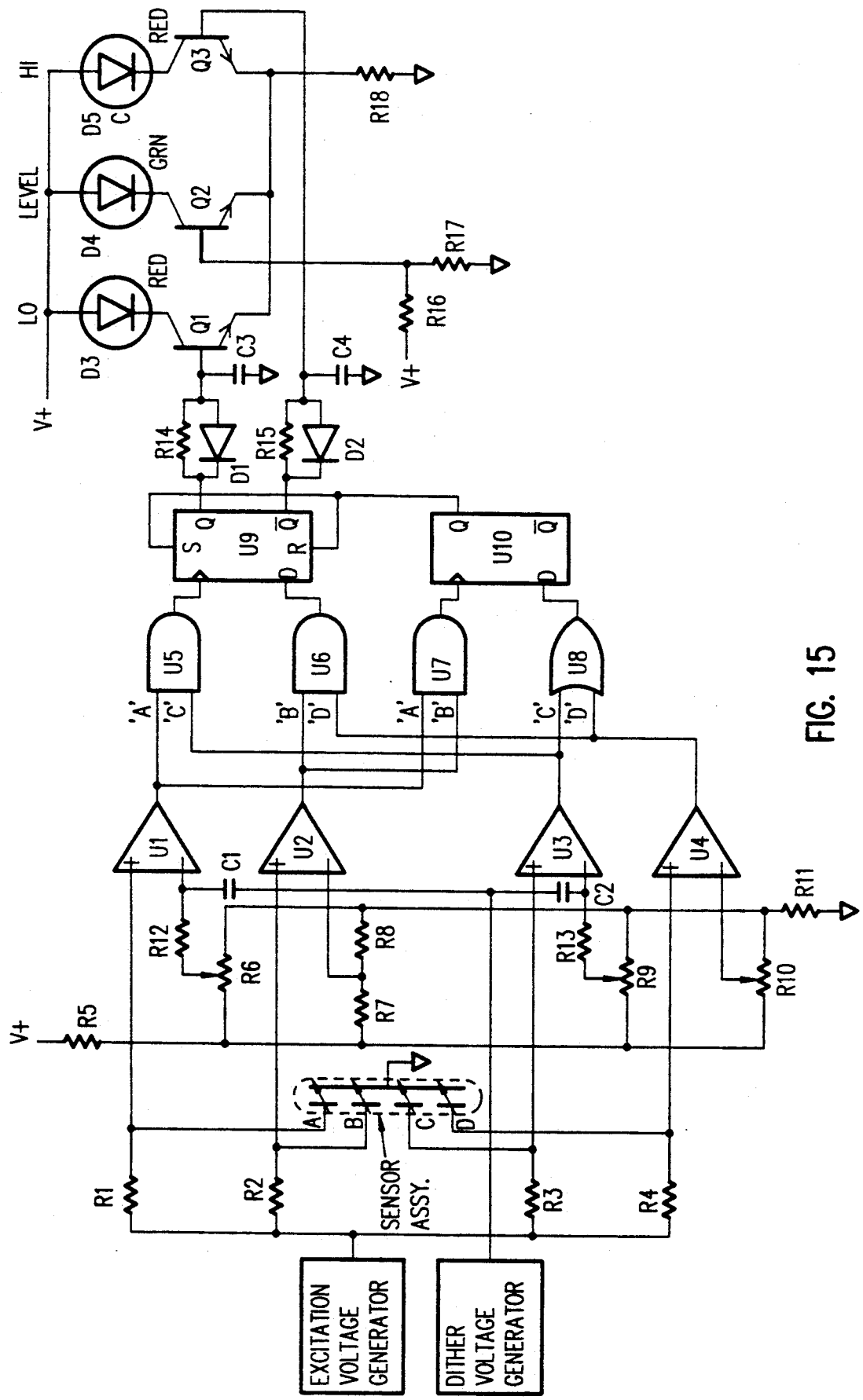
FIG. 15 shows a more detailed schematic of the embodiment of FIG. 13.
Figure 16A:
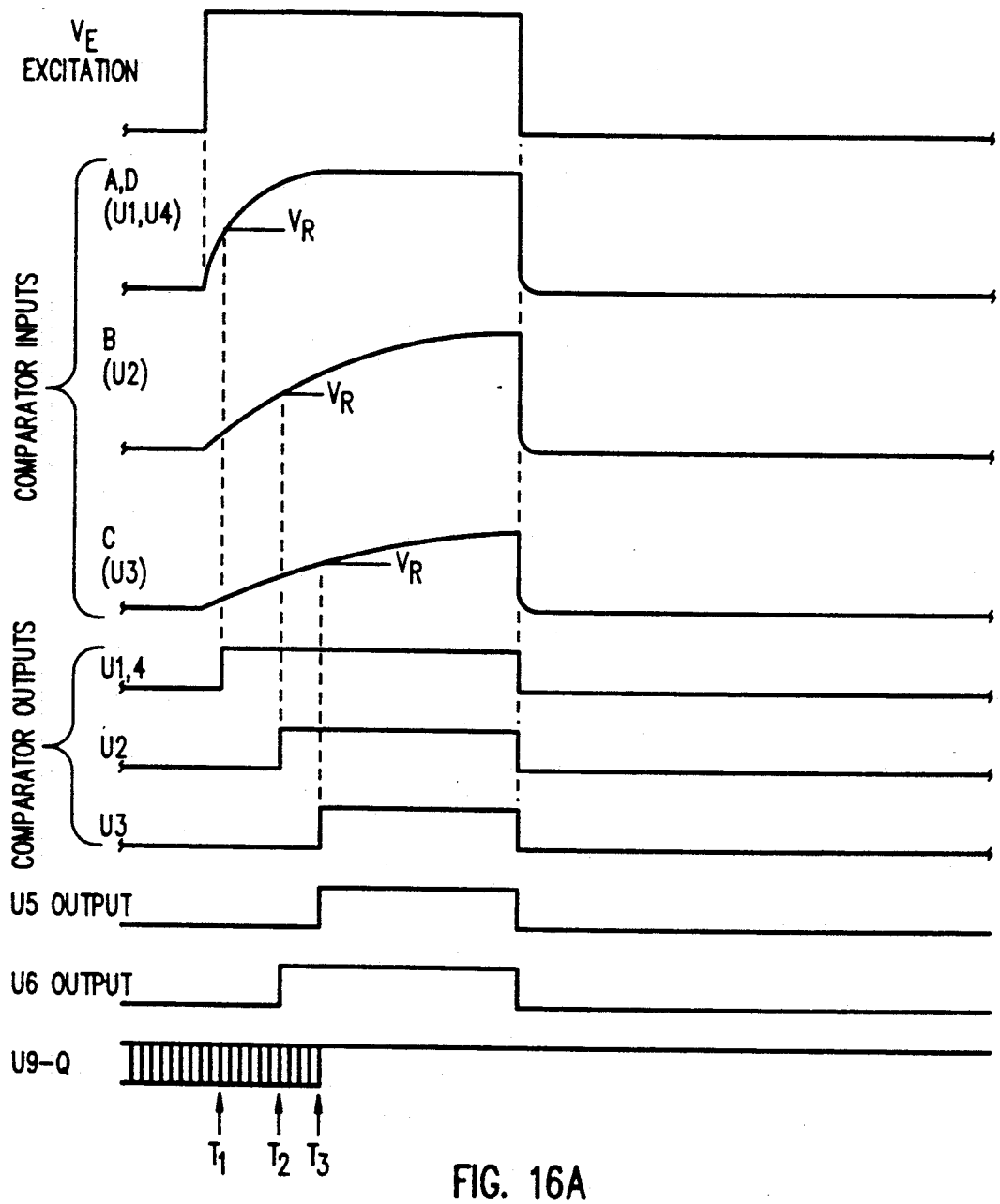
FIGS. 16A, 16B, 17 show waveforms associated with the embodiment of FIG. 15.
Figure 16B:
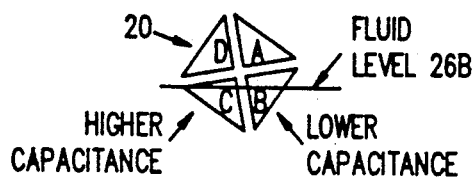
Figure 17:
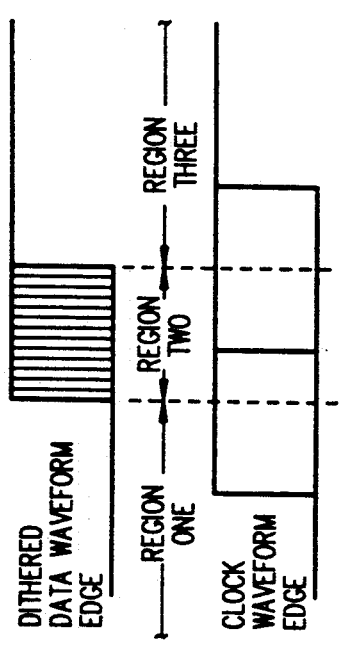

FIG. 13 shows a simplified circuit diagram of the basic sensor electronics in this embodiment with only a single pair of active electrodes C1, C2 shown for simplicity. The excitation voltage, $V_E$, as shown in the waveforms in FIG. 14 relating to the circuit of FIG. 13, charges sensor electrode capacitors C1 and C2 through resistors R1 and R2 when the voltage is high. If capacitors C1, C2 are matched (equal value) and resistors R1, R2 are matched, then the voltages $V_1$ and $V_2$ will have identical voltage vs. time characteristics and both will reach the common reference voltage, $V_R$, of comparators U1 and U2, at the same time (t1=t2 and t1−t2=0). The outputs of comparators U1 and U2 will then change state at the same time. If, however, capacitors C1, C2 are not the same value (as in FIG. 14, i.e., the sensor assembly is not level) then the sensor electrode with the lower capacitance will charge quicker and reach the reference voltage before the other electrode circuit. The outputs of capacitors U1, U2 will not change at the same time and this time difference (t2−t1) is used to indicate an out-of-level or unbalanced condition. A longer low output or "zero" time for $V_E$ ensures that capacitors C1, C2 are fully discharged before starting a new cycle. The duty curve of $V_E$ is typically 5%. FIGS. 13 and 15 show the logic of one embodiment of the invention. Referring to the circuit of FIG. 15 (showing the circuit of FIG. 13 in greater detail), the comparator outputs for a given pair of diagonal electrodes selected from electrodes A, B, C, D (for example, electrodes A and C) are connected to the inputs of an AND gate (for example, U5), with the other diagonal electrode pair B and D similarly connected. Assume that electrodes B and C are the active electrodes, in which case electrode A will reach the reference voltage $V_R$ before electrode C, and when C (the active element of the diagonal pair) does reach threshold, the output of U5 will go high. FIG. 16A shows the associated waveforms, with FIG. 16B showing the electrode configuration and orientation relative to the conductive fluid associated with the wave forms of FIG. 16A. Similarly, electrode D will reach threshold before B. The two active electrodes, B and C, are then controlling when the outputs of the AND gates, U5 and U6, go high. The non-active electrodes, A and D, reach the reference voltage at time t1 and their associated comparator outputs are then at a one level, waiting for B and C to "catch up" at times t2 and t3, at which times the AND gate outputs of U5 and U6 go high. The other positions of the sensor assembly (as shown in FIGS. 4A through 4D) operate in a similar manner. The two electrode pair auto-select logic outputs of gates U5 and U6 are processed to yield meaningful information for the user. These two signals are used as the Data and Clock inputs of a D-type flip-flop, U9 of FIG. 15. If the Clock signal from U5 precedes the Data from U6 in time, the Data (or D) input of flip-flop U9 will be a zero when the clock edge occurs, leaving flip-flop U9 in a logical zero state (Q 32 0, $\overline{Q}$=1), regardless of what state it was in prior to the clock. If the opposite condition exists (as shown in the waveforms of FIG. 16A; Data precedes Clock) flip-flop U9 assumes the opposite state after the clock (Q=1, $\overline{Q}$=0). The outputs of flip-flop U9 now indicate the sensor assembly's direction from level. No indication of a level condition exists yet, however. To provide an indication of level, a ten arc minute "window" is developed. This is done by "dithering", or wiggling, the Clock signal to flip-flop U9 in time with respect to the Data signal. If the Data signal to flip-flop U9 is within the dithering window of the Clock, flip-flop U9 will continue to change state between "1" and "0" as the Clock signal is sometimes early and sometimes late with respect to the Data signal. By adjusting the amount of time dither, a 10' window can be established. FIG. 17 illustrates this. If the Data edge occurs in Region One, flip-flop U9 will always be in a 0's state and if the Data edge is in Region Three, the flip-flop will always be in a 1's state. However, if the Data edge occurs in Region Two, the Clock edge will sometimes occur before the Data edge and sometimes after, resulting in flip-flop U9 continually changing state. The dither frequency is independent and non-coherent with the sensor assembly excitation frequency, $V_E$.

Dithering of the Clock signal is achieved by slightly modifying the threshold voltage into comparators U1 and U3 with a low level sawtooth waveform. The dithering signal is AC coupled via capacitors C1 and C2 so that any average direct current on the dither signal will not affect the average reference voltage.

To indicate a level condition (that is, the Data signal edge is within the dithered window) the outputs (both Q and $\overline{Q}$) of flip-flop U9 are filtered by constantly discharging the capacitors C4 and C3 through diodes D1 and D2, which keeps transistors Q1 and Q3 turned off. With transistors Q1 and Q3 off, transistor Q2 will be on, turning on the green level indicator LED, D4. If flip-flop U9, remains constant in either a 0 or a 1 state (indicating an out-of-level condition), the appropriate capacitor (either C3 or C4) will charge through either resistor R14 or R15 and as the base of either transistor Q1 or Q3 reaches the same voltage as transistors Q2's base, transistor Q1 or Q3 will start to turn on, and as the base voltage increases to 5 V (the flip-flop outputs' 1 level), transistor Q2 will be turned off entirely. By utilizing a differential comparator type of structure with transistors Q1, Q2 and Q3, a sharp on-off transition occurs at the boundaries of the dither window resulting in a clean "snap" action of the indicator LED's D3, D4, D5. Resistors R16 and R17 set the threshold at which the change from a level to un-level condition occurs and resistor R18 sets the LED D3, D4, D5 current (note that the circuit allows only one LED to be on at a time.)

Although the sensor assembly will operate in all four quadrants, in order to ease assembly and calibration requirements operation in one of the four quadrants is disallowed. The four possible configurations are:
1) Level
2) Plumb
3) Inverted Level
4) Inverted Plumb These correspond to FIGS. 4A through 4D, respectively. By not using Inverted Plumb, calibration costs are lowered. (Plumb will fulfill any operating requirement in the vertical mode, whereas both Level and Inverted Level are needed in the horizontal mode due to having only one reference surface on the level device housing in this embodiment.)

Gates U7 and U8 along with flip-flop U10 comprise a detector for the Inverted Plumb mode (sensor elements C and D active).

Figure 18:
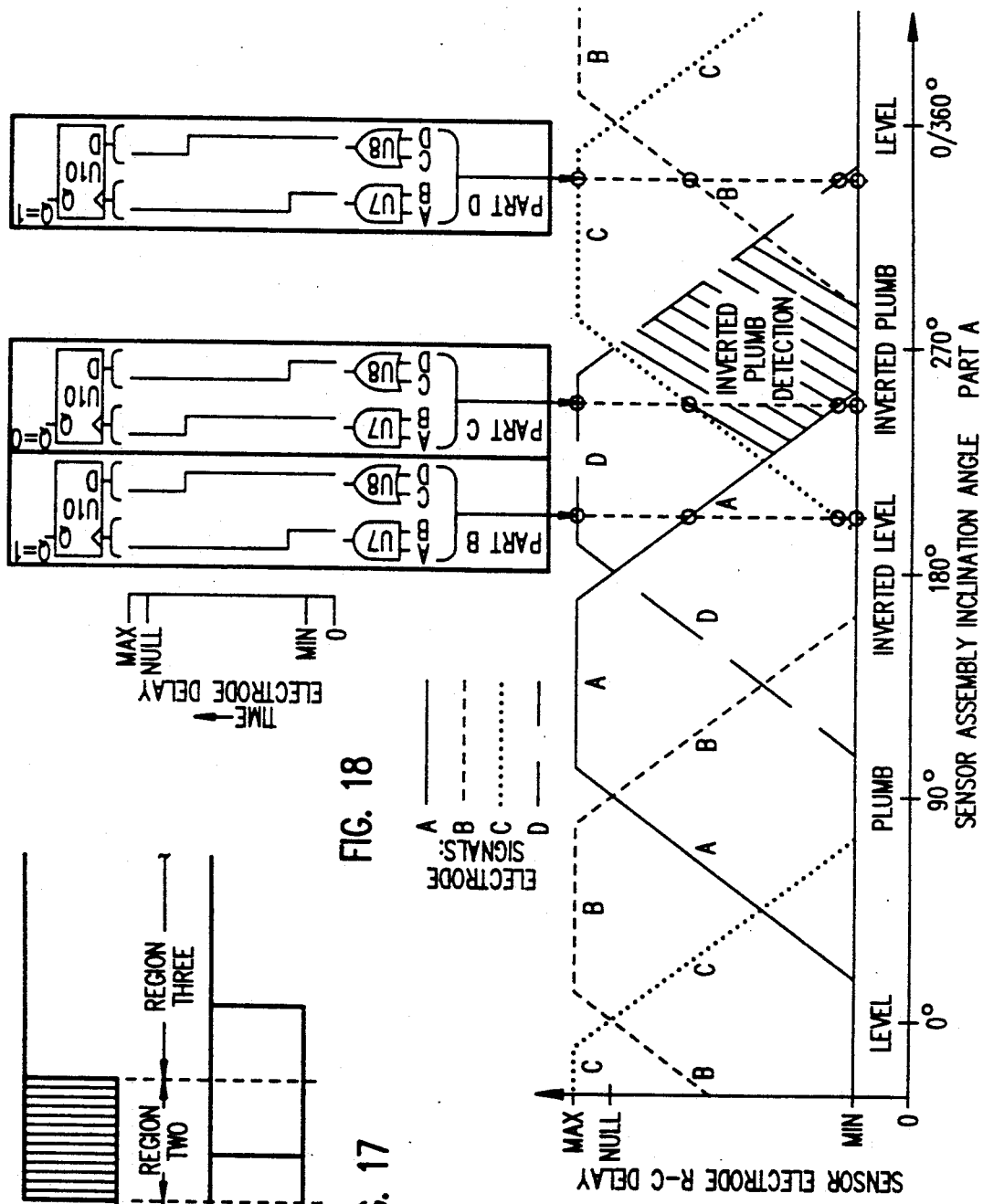
FIG. 18 shows diagrammatically how the electrode autoselect operates.

FIG. 18 illustrates this logic. FIG. 18, Part A shows each sensor's delay time on one axis versus the inclination angle (or rotational angle) of the entire sensor array on the other axis.

As the sensor assembly is rotated through 360°, each of the comparator outputs associated with the individual electrodes will have a varying time delay between the 'zero' to 'one' edge transition of the excitation voltage, $V_E$ and the edge transition of any one comparator's output. If, for example, a given electrode has no fluid coverage (is unwetted), this delay time will be minimal. If however, the given electrode has some fluid coverage, the delay time will increase from the minimum value, and as the maximum percentage of wetted electrode area is reached, the delay time will be at the maximum achievable. Note that the maximum time delay achievable does not correspond to the null, or equal capacitance values for any given active or wetted electrode pair. This is due to the fluid coverage at null of an electrode being approximately 80% of the total electrode area. As the sensor assembly is rotated away from this null condition, one active electrode will experience less fluid coverage but the other will increase in area fluid coverage to a maximum before decreasing toward a minimum as the sensor assembly is rotated further to introduce a new, active electrode pair. There are four separate signals, one for each sensor element comparator output A through D. By detecting the overlap region A/B and C/D with suitable logic, the Inverted Plumb position is uniquely detected.

Note in FIG. 18, Part A, that in the region between inclination angles 225° and 315°, i.e. the Inverted Plumb condition, sensor comparator outputs C and D have longer delay times than do A and B. This region can be uniquely detected by logically AND'ing signal A with B by logic gate U7 and logically OR'ing signal C with D by logic gate U8. The output of gate U7 will have a longer delay than gate U8 only in this region.

The outputs of gates U7 and U8 are processed in an identical way as the main signal processing is done (by gates U5 and U6) to detect the direction of out-of-level condition.

The output of gate U7 is the Clock signal to a D-type flip-flop, U10 and gate U8's output is the Data signal. In the Inverted Plumb region, with gate U7's output having a longer delay than that of gate U8, the Data input to flip-flop U10 from gate U8 will be a on time of the Clock edge from gate U7, thus setting flip-flop U10 to a one state (as shown in FIG. 18, Part C). In any other region of inclination angle, the opposite is true, with flip-flop U10 being set to a zero state, as shown in FIG. 18, Parts B and D.

To disallow usage of this detected physical condition, a normally unused feature of a D-type flip-flop is used. If both Set and Reset inputs are high at the same time, both Q and $\bar{Q}$ outputs will be high. This will cause both High and Low out-of-level LED's to be on (D3 and D5 of FIG. 15) and will not allow a conventional, visual output associated with normal operating positions (a single LED on at a time). The Q output of flip-flop U10 is connected to the Set and Reset inputs of flip-flop U9 to provide this action. When the level exits the Inverted Plumb mode, normal operation automatically resumes.

A low battery indication provided in accordance with the invention also utilizes the above feature of a D-type flip-flop. If a low battery sensor deriving a logic type signal is connected with the correct logic sense to flip-flop U10's set input such that when a low battery condition exists, flip-flop U10 will be set to a "1", causing both High and Low LED's to be on simultaneously. Normal operation is precluded, as no normal operating indication can be obtained.

Figure 19A:
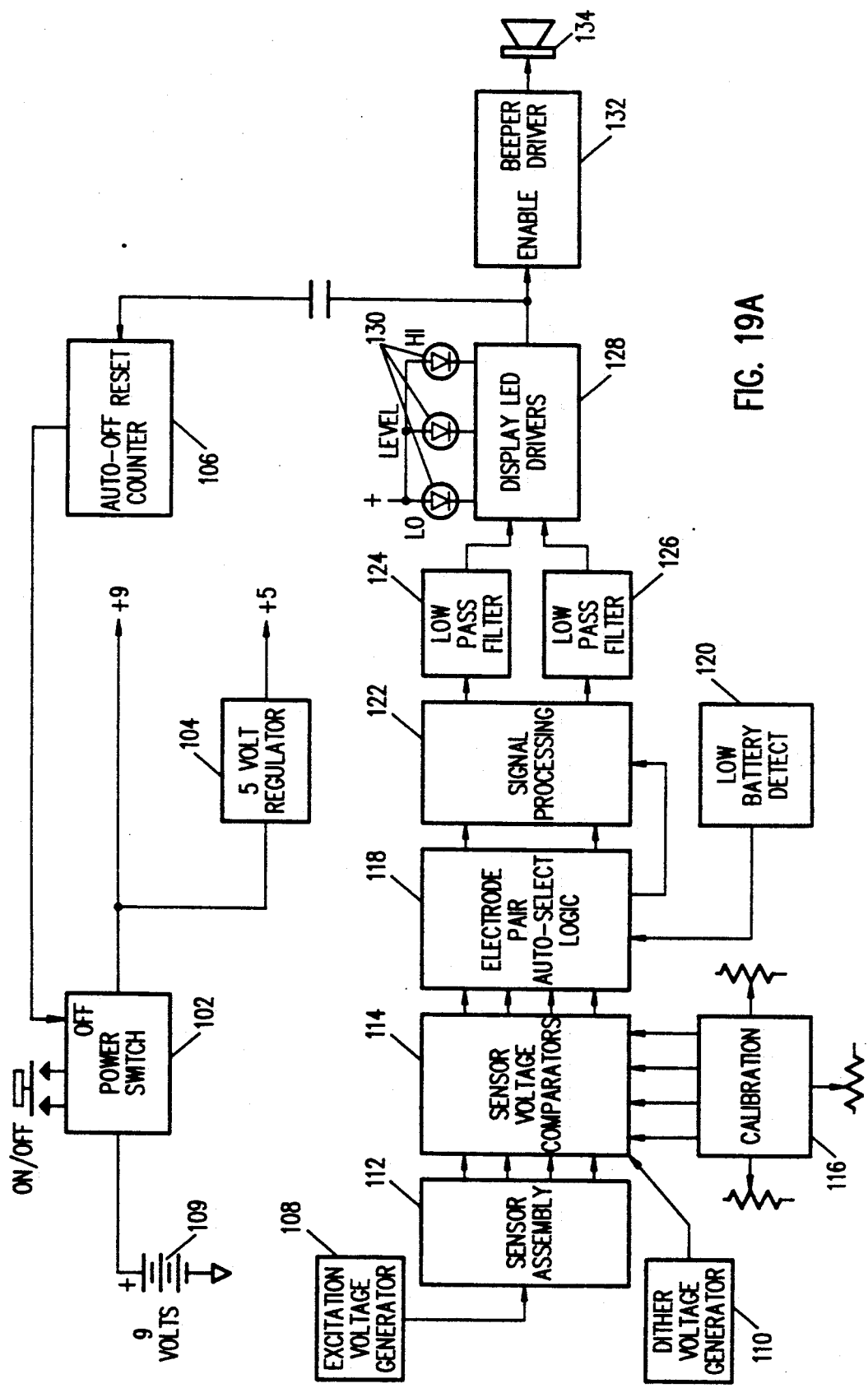
FIG. 19A shows a block diagram of a level device.

FIG. 19A shows the entire level device in block diagram form. Shown are battery 100, power switch 102, five volt regulator 104, auto-off counter 106, excitation voltage generator 108, dither voltage generator 110, sensor assembly 112, sensor voltage comparator 114, calibration circuit 116, electrode pair auto select logic 118, low battery detector 120, signal processing circuitry 122, low-pass filters 124, 126, display LED drivers 128, LED's 130, and beeper driver 132 for driving beeper 134. Note that auto-off counter 106 automatically turns the device off if the sensors 112 are electrically quiescent for a predetermined period such as two minutes.

Figure 19B:
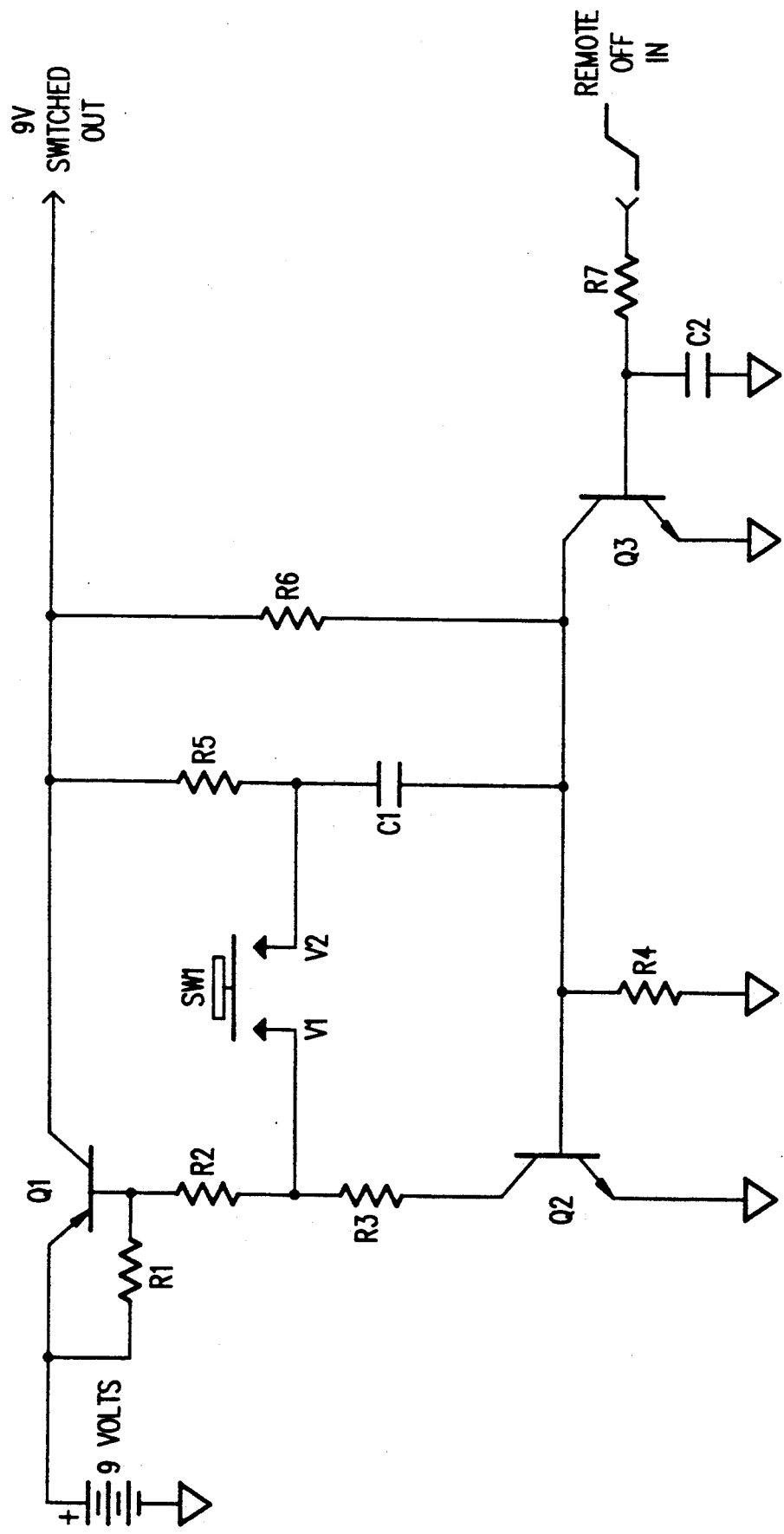
FIG. 19B shows the power switch of FIG. 19A.
Figure 20A:
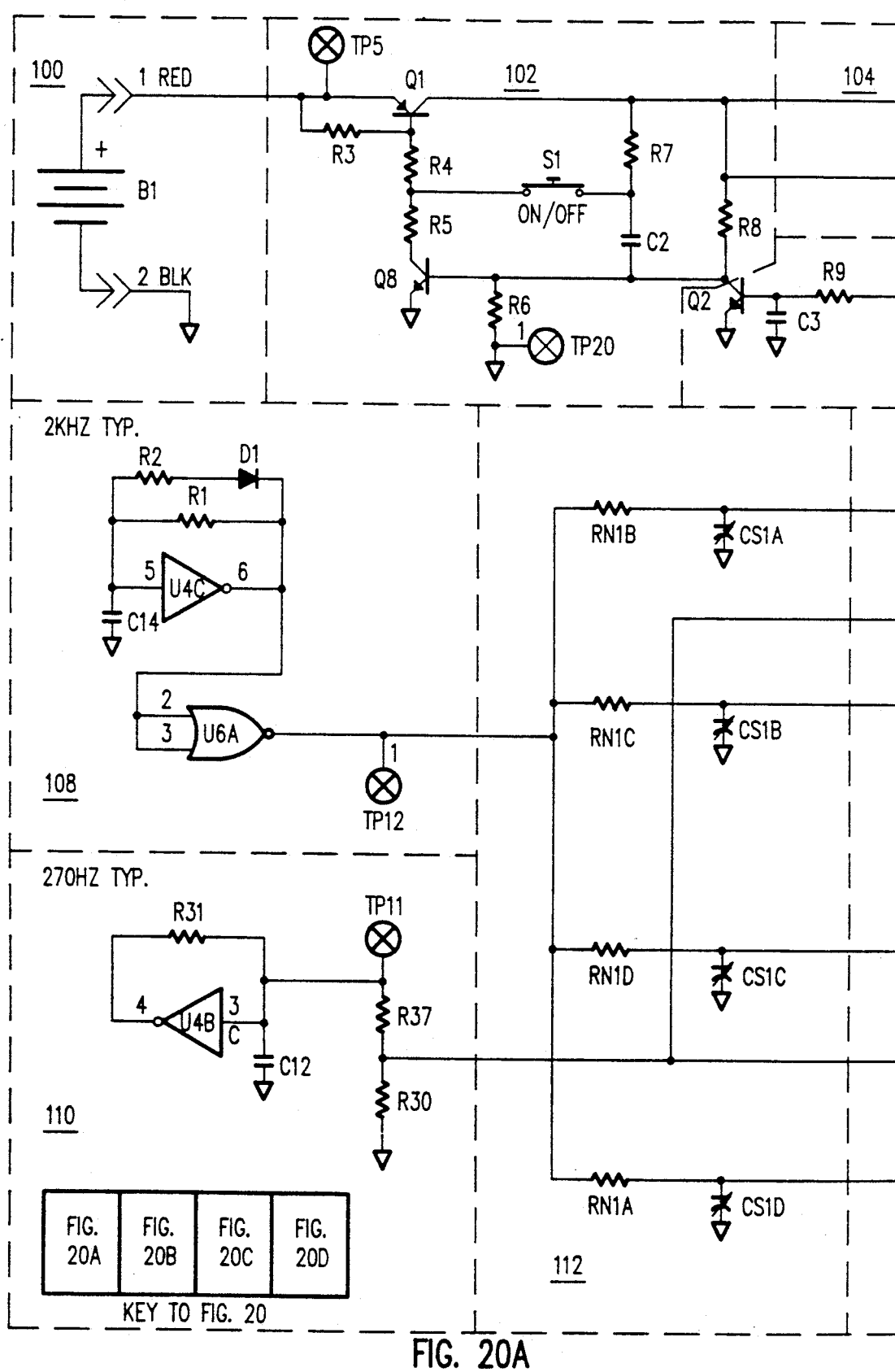
FIG. 20 shows a schematic for the device of FIG. 19A.
Figure 20B:
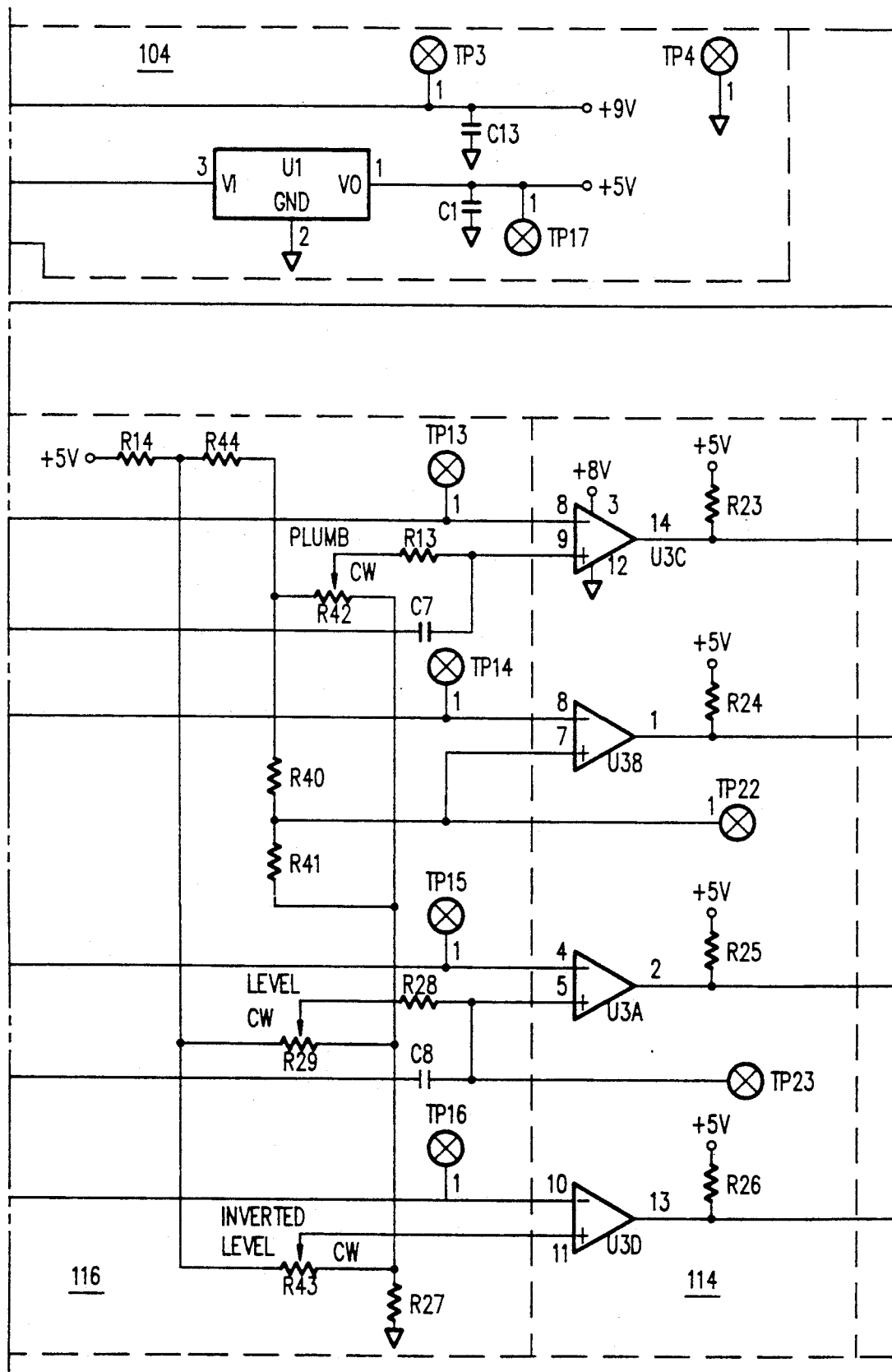
Figure 20C:
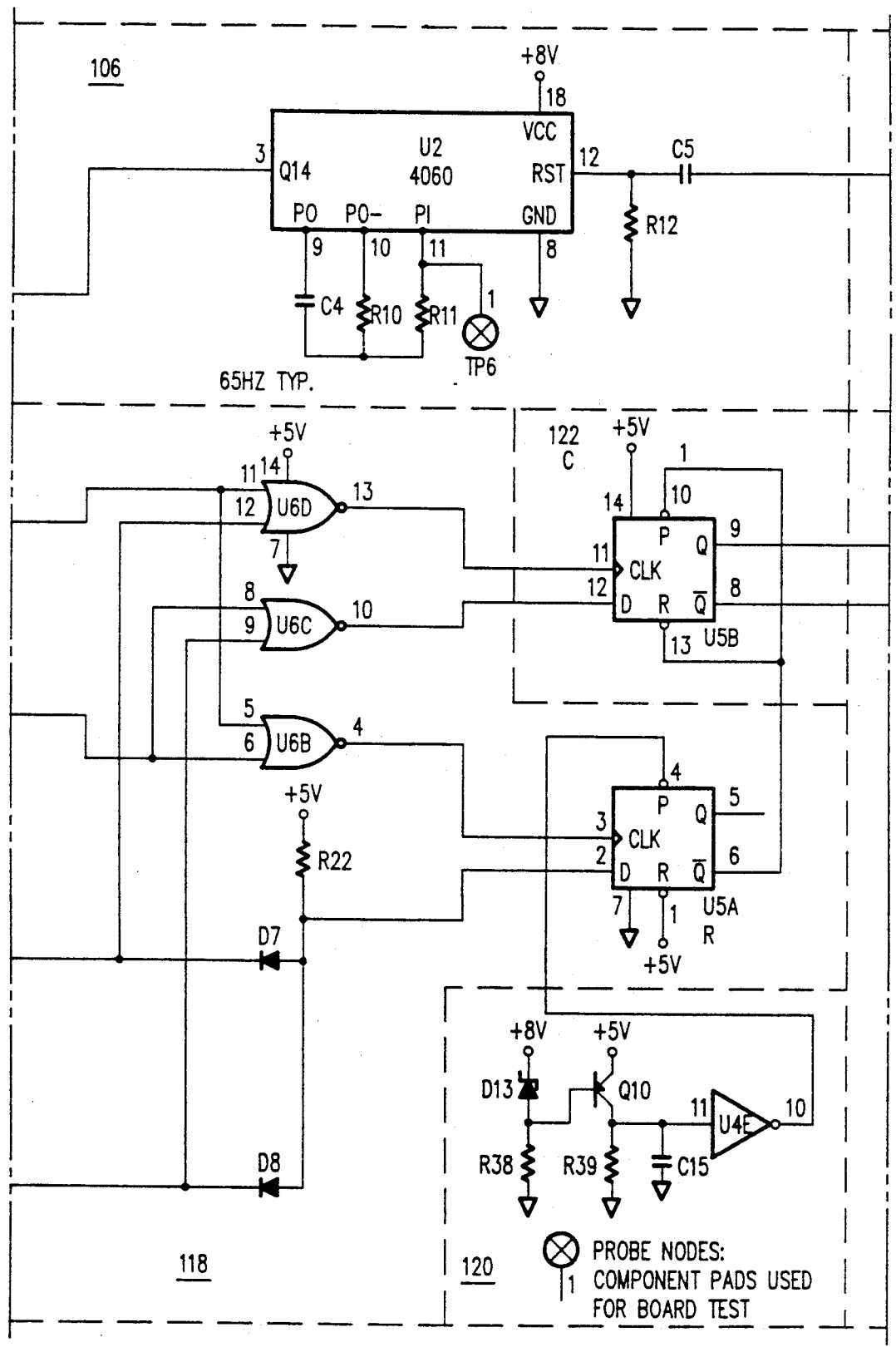
Figure 20D:
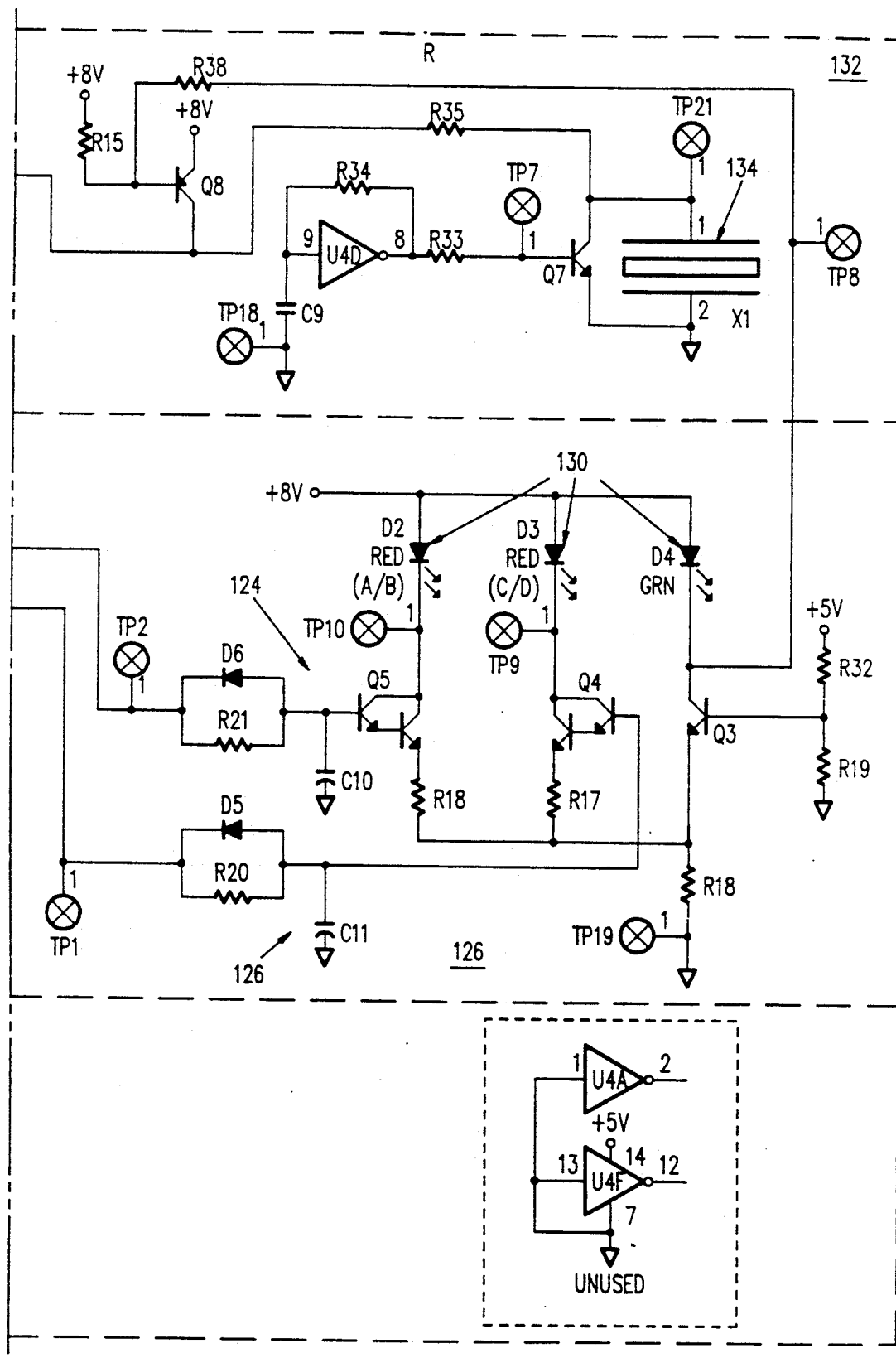

Power switch 102 has several advantageous features including a single, non-mechanical latching switch controlling both on and off functions; no standby power drain when off; and input for remote off signal. Referring to FIG. 19B showing in detail power switch 102, assuming the switch to be off, voltage $V_1$ is 9 V and voltage $V_2$ is 0 V. The charge on capacitor C1 is zero. When switch SW1 is closed, the voltage across capacitor C1 will still be zero, but current will flow through the circuit resistor R1, R2, capacitor C1 and resistor R4, turning on transistor Q2. This in turn will turn on transistor Q1. As the voltage at transistor Q1's collector rises, additional base current to transistor Q2 will flow through resistor R6, latching the circuit on. Capacitor C1 will continue to charge through resistors R5 and R4 until voltage $V_2$ is about 9 volts and the base of transistor Q2 will be about 0.8 volts. This places about an 8.2 volt charge on capacitor C1. Also at circuit-on quiescence, voltage V1 is about 4.3 volts (R2=R3).

Now as SW1 is again closed (and assuming R5>>R2>R3), voltages V1 and V2 will equal about 4.3 volts. The charge across capacitor C1 is still 8.2 volts, which puts a −3.9 volts on transistor Q2's base, turning transistor Q2 off. This in turn turns off transistor Q1 and the switch is off The charge on capacitor C1 will decay away to zero which is the condition previously noted when the switch is off.

Remote off capability is provided via transistor Q3 which, when turned on, removes all base drive from transistor Q2, thus turning the switch off. Capacitor C2 on the base of transistor Q3 provides charge retention to keep transistor Q3 on as the remote off signal is removed insuring reliable circuit turn-off.

FIG. 20 illustrates schematically one embodiment of the entire device as shown in FIG. 19A, with the blocks of FIG. 19A outlined with dotted lines and labeled with the reference numbers of FIG. 19A.

The above description of the invention is illustrative and not limiting; further embodiments will be apparent in light of the teachings of the invention.

I claim:

1. A capacitive inclination sensor device comprising:
   a first electrode;
   conductive liquid in electrical contact with the first electrode, the conductive liquid having a surface;
   a second electrode covered by a dielectric layer and juxtaposed to the surface of the conductive liquid;
   a third electrode covered by a dielectric layer and juxtaposed to the surface of the conductive liquid;
   a first electrical resistance connected in series to the second electrode;
   a second electrical resistance connected in series to the third electrode;
   first means for determining a charging time of a circuit including the first resistance and a capacitance between the first electrode and the second electrode;
   second means for determining a charging time of a circuit including the second resistance and a capacitance between the first electrode and the third electrode; and
   means for comparing the charging time determined by the first means for determining to the charging time determined by the second means for determining, wherein an inclination of the device is determined in one cycle of a varying voltage applied to the first means for determining.

2. The device of claim 1, wherein the first electrode is a first planar surface, and further comprising a fourth electrode and a fifth electrode, and wherein the second, third fourth, and fifth electrodes are quadrants formed on a second planar surface parallel to and spaced apart from the first planar surface.

3. The device of claim 1, wherein the conductive fluid comprises alcohol and water, the second and third electrodes are formed on a ceramic substrate, and the dielectric layers are a glass material.

4. The device of claim 1, wherein the means for comparing is a null sensor for sensing a condition of the device, said condition being about parallel or perpendicular to the direction of gravity, by determining equal charging times to a predetermined voltage level by the first and second means for determining, and further comprising means for adjustably determining a range of inclinations of the device at which the condition is sensed.

5. The device of claim 4, further comprising:
a fourth and a fifth electrode; and
means for automatically selecting two of the second through fifth electrodes to determine a level or plumb inclination of the device.

6. The device of claim 1, wherein the first and second means for determining each determine the charging time by sensing a reference voltage level across the capacitance, and further comprising means for varying a reference voltage level which is sensed by either of said means for determining.

7. The device of claim 1, wherein the means for comparing comprises:
a first logic gate having an input terminal connected to an output terminal of the first means for determining;
a second logic gate having an input terminal connected to an output terminal of the second means for determining;
means for providing a varying dither voltage to both the first and second means for determining, thereby providing an adjustable variation in the time of charging; and
a flip-flop having a data input terminal and a clock terminal respectively connected to an output terminal of the first logic gate and of the second logic gate.

8. The device of claim 1, further comprising:
a fourth electrode;
a fifth electrode;
a third electrical resistance connected in series to the fourth electrode;
a fourth electrical resistance connected in series to the fifth electrode;

third means for determining a charging time of a circuit including the third resistance and a capacitance between the first electrode and fourth electrode;
fourth means for determining a charging time of a circuit including the fourth resistance and a capacitance between the first electrode and fifth electrode; and
means for automatically selecting any two of the second through fifth electrodes to determine a level or plumb condition of the device, including:
a first logic gate having tow input terminals respectively connected to receive output signals from the first and third means for determining;
a second logic gate having two input terminals respectively connected to receive output signals from the second and fourth means for determining; and
a flip-flop having its clock terminal and data input terminal respectively connected to receive output signals from the first and second logic gates;
whereby a data terminal of the flip-flop provides a signal in response to the automatic selection of a pair of the electrodes.

9. A method for measuring inclination comprising the steps of:
providing a first electrode;
providing a conductive liquid in electrical contact with the first electrode, the conductive liquid having a surface;
providing a second electrode covered by a dielectric layer and juxtaposed to the surface of the conductive liquid;
providing a third electrode covered by a dielectric layer and juxtaposed to the surface of the conductive liquid;
electrically connecting a first resistance in series to the second electrode;
electrically connecting a second resistance in series to the third electrode;
determining a first charging time of the first resistance and a capacitance between the first and second electrodes;
determining a second charging time of the second resistance and a capacitance between the first and third electrodes; and
comparing the first and second charging times, wherein an inclination of the device is determined in one cycle of a varying voltage used to determine the first charging time.

* * * * *